US012781675B2

(12) United States Patent
Koiwai et al.

(10) Patent No.: US 12,781,675 B2
(45) Date of Patent: Nov. 3, 2026

(54) ENGINE POWER GENERATION SYSTEM CONTROL DEVICE

(71) Applicant: Hitachi, Ltd., Tokyo (JP)

(72) Inventors: Ryutaro Koiwai, Tokyo (JP); Atsushi Shimada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 19/112,119

(22) PCT Filed: Oct. 6, 2023

(86) PCT No.: PCT/JP2023/036638
§ 371 (c)(1),
(2) Date: Mar. 14, 2025

(87) PCT Pub. No.: WO2024/106061
PCT Pub. Date: May 23, 2024

(65) Prior Publication Data

US 2026/0092569 A1 Apr. 2, 2026

(30) Foreign Application Priority Data

Nov. 15, 2022 (JP) ................................ 2022-182469

(51) Int. Cl.
*F02D 41/00* (2006.01)
*F01N 3/20* (2006.01)
(Continued)

(52) U.S. Cl.
CPC ....... *F02D 41/0027* (2013.01); *F02D 41/025* (2013.01); *F02D 41/1446* (2013.01);
(Continued)

(58) Field of Classification Search
CPC ............... F01N 3/2006; F01N 2410/03; F01N 2410/06; F01N 2430/04; F01N 2430/06;
(Continued)

(56) References Cited

U.S. PATENT DOCUMENTS 11,598,249 B1 * 3/2023 Lavertu ............... F02D 41/3094
2005/0155344 A1 * 7/2005 Kobayashi .......... F02D 41/3058
123/304
(Continued)

FOREIGN PATENT DOCUMENTS

JP 2005299525 A 10/2005
JP 5772958 B2 7/2015
(Continued)

*Primary Examiner* — Binh Q Tran
(74) *Attorney, Agent, or Firm* — Volpe Koenig

(57) ABSTRACT

There is provided an engine power generation system control device that reduces emission of a harmful substance contained in an exhaust gas to the outside by performing prompt activation of an exhaust purification catalyst and prompt warmed-up of an engine in a power generation system including an engine enabling an RE fuel and a hydrocarbon-based fuel to be supplied and performing co-combustion. A hydrocarbon-based fuel supply amount or a hydrogen supply amount to the engine is controlled based on a catalyst active state detected by a catalyst active state detecting unit and a warmed-up state of the engine detected by an engine warmed-up state detecting unit.

14 Claims, 21 Drawing Sheets

(51) Int. Cl.

| | |
|---|---|
| ***F02D 13/02*** | (2006.01) |
| ***F02D 19/06*** | (2006.01) |
| ***F02D 41/02*** | (2006.01) |
| ***F02D 41/06*** | (2006.01) |
| ***F02D 41/14*** | (2006.01) |

(52) U.S. Cl.

CPC ..... *F02D 41/1454* (2013.01); *F02D 41/1475* (2013.01); *F01N 3/2006* (2013.01); *F01N 2410/06* (2013.01); *F01N 2430/04* (2013.01); *F01N 2900/1626* (2013.01); *F02D 2013/0292* (2013.01); *F02D 19/0644* (2013.01); *F02D 41/068* (2013.01); *F02D 2200/021* (2013.01); *F02D 2200/0804* (2013.01)

(58) Field of Classification Search

CPC ..... F01N 2900/1404; F01N 2900/1602; F01N 2900/1626; F02D 19/0644; F02D 41/0027; F02D 41/025; F02D 41/064; F02D 41/068; F02D 41/1446; F02D 41/1454; F02D 41/1475; F02D 2013/0292; F02D 2200/021; F02D 2200/0804

See application file for complete search history.

(56) References Cited

U.S. PATENT DOCUMENTS

| | | | | |
|---|---|---|---|---|
| 2008/0167791 | A1* | 7/2008 | Fulton | F02M 26/47 60/299 |
| 2008/0223344 | A1* | 9/2008 | Suzuki | F02D 19/0671 123/3 |
| 2012/0167840 | A1* | 7/2012 | Miyagawa | F02D 19/0671 422/111 |
| 2013/0226436 | A1* | 8/2013 | Morita | F02D 19/084 701/103 |
| 2018/0258815 | A1* | 9/2018 | Tanaka | F02D 41/1441 |

FOREIGN PATENT DOCUMENTS

| | | | | |
|---|---|---|---|---|
| JP | 2017166386 | A | 9/2017 | |
| WO | WO-2021257549 | A1 * | 12/2021 | F02M 27/04 |

* cited by examiner

FIG. 11

| | | CATALYST ACTIVITY STATE | |
|---|---|---|---|
| | | INACTIVE | ACTIVE |
| ENGINE WARM-UP STATE | COLD | MODE 1: HYDROCARBON-BASED FUEL-ONLY COMBUSTION (STOICHIOMETRIC) | MODE 2: HYDROGEN CO-COMBUSTION (STOICHIOMETRIC) |
| | WARMED-UP | | MODE 3: HYDROGEN CO-COMBUSTION (LEAN) |

FIG. 17

| | | CATALYST ACTIVITY STATE | |
|---|---|---|---|
| | | INACTIVE | ACTIVE |
| ENGINE WARM-UP STATE | COLD | MODE 1: HYDROCARBON-BASED FUEL-ONLY COMBUSTION (STOICHIOMETRIC) | MODE 2: HYDROGEN CO-COMBUSTION (STOICHIOMETRIC) |
| | WARMED-UP | | MODE 3: HYDROGEN CO-COMBUSTION (LEAN)<br>MODE 4: HYDROCARBON-BASED FUEL-ONLY COMBUSTION (STOICHIOMETRIC) |

ENGINE POWER GENERATION SYSTEM CONTROL DEVICE

TECHNICAL FIELD

The present invention relates to an engine power generation system control device compatible with co-combustion of a fuel derived from renewable energy such as hydrogen and a hydrocarbon-based fuel such as gasoline or natural gas.

BACKGROUND ART

Progress in widening the use of renewable energy for the decarbonization of energy increases the importance of adjusting power generation systems using renewable energy-derived fuels (hereinafter, referred to as RE fuels) such as hydrogen, in order to cope with the fluctuations in power with renewable energy.

Large-scale gas-fired power generation can be utilized for adjusting power, but an output adjustment range thereof is limited to a range of 30% to 100% of the rated operation, and does not provide sufficient adjusting power. In addition, since installation places of equipment are fixed, power lines need to be reinforced, and equipment costs are high. Further, since large-scale thermal power generation is limited in the range of fuels which can be procured therefor, it may be difficult to effectively utilize the RE fuels that are ubiquitous in a region.

Distributed power generation systems utilizing an engine power generator compatible with the RE fuels are promising as systems capable of coping with a change in renewable energy while utilizing the RE fuels that are ubiquitous in a region. In particular, it is possible to minimize initial equipment costs by utilizing mass-produced engines such as existing motor vehicle engines or industrial engines and using the engines as stationary power generation systems. In addition, engines capable of performing mixed combustion (hereinafter, referred to as co-combustion) of an RE fuel such as hydrogen and a hydrocarbon-based fuel such as gasoline or natural gas are employed, thereby enabling power generation systems to be operated depending on a production amount and a procurement amount of the RE fuel so that an operation rate can increase.

Regarding an engine power generation system control device related thereto, PTL 1 is known. PTL 1 discloses "an internal combustion engine fuel supply apparatus that is configured to be able to independently supply a hydrogen fuel and a hydrocarbon-based fuel to a combustion chamber of an internal combustion engine and has a first combustion control mode in which the hydrocarbon-based fuel is supplied to a radially central portion of the combustion chamber or a surrounding portion of a spark plug provided with respect to the combustion chamber in the combustion chamber, and the hydrogen fuel is supplied to a periphery of a space to which the hydrocarbon-based fuel is supplied in the combustion chamber".

CITATION LIST

Patent Literature

PTL 1: JP 5772958 B

SUMMARY OF INVENTION

Technical Problem

Since the exhaust gas from engines contains carbon monoxide (CO), hydrocarbons (HC), nitrogen oxides (NOx), and the like, which are harmful to the human body, animals, and plants, it is necessary to reduce the amount of emissions of these harmful substances to the outside. For this purpose, it is effective to provide an exhaust purification catalyst in an exhaust channel of the engine to remove harmful substances (NOx, THC, CO, and the like) by purification and to reduce the amount of harmful substances directly emitted from the engine. First, regarding purification by a catalyst, prompt activation of the catalyst is a problem. This is because purification by removing the harmful substances can be effectively performed by increasing a temperature of the catalyst and activating the catalyst. Next, regarding the reduction of the amount of harmful substances directly emitted from the engine, lean combustion is effective in which the minimum amount of air required for complete combustion is used in combustion in the state of using leaner fuel (hereinafter, referred to as lean) than in a theoretical air-fuel ratio which is a ratio of air to fuel. This is because lean combustion decreases the combustion gas temperature, which significantly reduces the amount of NOx generated by combustion. In addition, since oxygen is contained in the exhaust gas in the lean combustion, purification can be performed by a three-way catalyst by removing both THC and CO. On the other hand, since combustion stability deteriorates in the lean combustion, promptly achieving an engine warmed-up state in which stable combustion is possible (hereinafter, referred to as prompt engine warmed-up) is a challenge. In addition, in a co-combustion engine enabling a plurality of fuels to be independently supplied, it is necessary to solve the above-described challenge in consideration of properties of each fuel.

In this regard, in the conventional technology described in PTL 1, the hydrocarbon-based fuel and hydrogen are co-combusted in a case where a temperature of the catalyst increases, and thus the time taken to activate the catalyst increases as compared with a case where the hydrocarbon-based fuel is exclusively combusted. This is because a temperature of the exhaust gas generated by the combustion of hydrogen is lower than a temperature of the exhaust gas generated by the combustion of the hydrocarbon-based fuel. Further, the conventional technology described in PTL 1 is limited to a configuration including means capable of controlling a spatial distribution of the fuels in the combustion chamber. For example, in a configuration in which the hydrocarbon-based fuel and hydrogen are supplied from a middle portion of an inlet pipe, the hydrocarbon-based fuel and hydrogen are supplied into the combustion chamber in the state of being well mixed, and thus it is difficult to apply the conventional technology thereto.

The present invention has been made in view of such a circumstance, and an object of the present invention is to provide an engine power generation system control device capable of prompt activation of an exhaust purification catalyst and prompt warmed-up of an engine in a power generation system including an engine enabling an RE fuel and a hydrocarbon-based fuel to be supplied and performing co-combustion.

Solution to Problem

In order to solve the above problem, the present invention provides "an engine power generation system control device for an engine power generation system that is capable of performing co-combustion when supplying a hydrocarbon-based fuel and hydrogen and performs power generation by an engine including an engine warmed-up state detecting unit which detects whether the engine is in a warmed-up state, the engine power generation system control device including: a catalyst which is provided in an exhaust passage of the engine and purifies an exhaust gas; and a catalyst active state detecting unit that detects whether the catalyst is in an active state, in which a hydrocarbon-based fuel supply amount or a hydrogen supply amount to the engine is controlled based on a catalyst active state detected by the catalyst active state detecting unit and a warmed-up state of the engine detected by the engine warmed-up state detecting unit".

Advantageous Effects of Invention

According to the present invention, since it is possible to control supply amounts of a hydrocarbon-based fuel and hydrogen depending on an active state of a catalyst and a warmed-up state of an engine, prompt activation of the catalyst and prompt warm up of the engine can be performed, and this can reduce emission of a harmful substance contained in an exhaust gas to the outside.

Problems, configurations, and effects other than those described above will be clarified by the following description of embodiments.

BRIEF DESCRIPTION OF DRAWINGS

FIG. 11 is a table illustrating an operation mode according to the first embodiment of the present invention.

FIG. 17 is a table illustrating an operation mode according to the second embodiment of the present invention.

DESCRIPTION OF EMBODIMENTS

Hereinafter, embodiments of the present invention will be described with reference to the accompanying drawings. In the present invention, at least one fuel is hydrogen, and the other fuel is a hydrocarbon-based fuel. In the embodiments, natural gas exemplifies the hydrocarbon-based fuel, but light oil or gasoline may be used. A combination of the fuels can be appropriately selected.

First Embodiment

Figure 1:
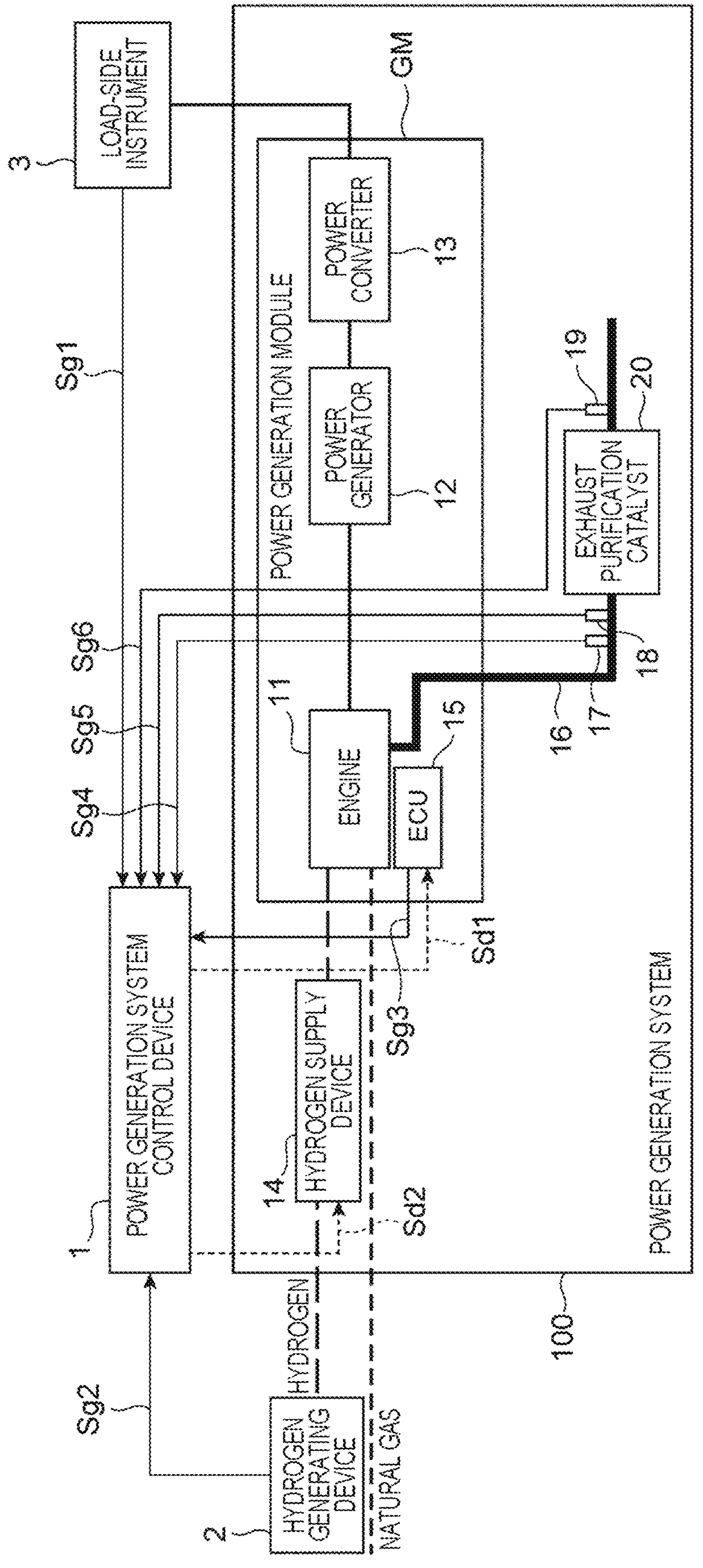
FIG. 1 is a schematic configuration diagram illustrating an example in which a power generation system control device is applied to a power generation system including an engine power generator using hydrogen and natural gas as fuels according to a first embodiment of the present invention.

FIG. 1 is a schematic configuration diagram illustrating an example in which a power generation system control device is applied to a power generation system including an engine power generator using hydrogen and natural gas as fuels according to a first embodiment of the present invention.

A power generation system 100 includes a power generation module GM including an engine 11, a power generator 12, and a power converter 13, and the engine 11 includes an electronic control unit (ECU) 15 for controlling the engine 11. The engine 11 is connected to a hydrogen generating device 2 via a hydrogen supply device 14 and can supply a hydrogen fuel. In addition, although not illustrated, the engine is connected to a fuel tank and can supply natural gas, thereby enabling combustion to be performed by a hydrogen fuel, natural gas, or a mixed fuel of hydrogen and natural gas. An output of the power generation module GM is electrically connected to a load-side instrument 3.

As a minimum configuration of the power generation module GM which is applicable to the present invention, the engine 11 and the power generator 12 need to be included, and the power converter 13 may be appropriately included depending on whether a load is an AC load or a DC load. In addition, the power generator 12 may be either an AC generator or a DC generator.

Further, a three-way catalyst 20 as an exhaust purification catalyst for purifying an exhaust gas, a catalyst upstream temperature sensor 18 that measures a temperature (catalyst-inflow gas temperature) of a gas flowing into the three-way catalyst 20, an air-fuel ratio sensor 17 that is an aspect of an air-fuel ratio detector and detects an air-fuel ratio of the exhaust gas on a side upstream of the three-way catalyst 20, and an oxygen concentration sensor 19 that detects an oxygen concentration of the exhaust gas on a side downstream of the three-way catalyst 20 are provided at respective appropriate positions of an exhaust passage 16 of the engine 11.

The three-way catalyst 20 simultaneously performs oxidation of a hydrocarbon and carbon monoxide in the exhaust gas and reduction of nitrogen oxides and removes harmful components in the exhaust gas by purification into carbon dioxide, water vapor, and nitrogen. In order to maximize purification efficiency by the three-way catalyst 20, a ratio between reactive components (HC, NOx, CO, and $H_2$) needs to be a stoichiometrically ideal value. A range of an air-fuel ratio of an air-fuel mixture which realizes the above-described state is referred to as a window, and in a general spark ignition type engine, a mass ratio of air and a fuel falls within a very narrow range around a theoretical air-fuel ratio (stoichiometric) that is a ratio of a minimum amount of air and a fuel which is required for complete combustion.

A power generation system control device 1 is mounted on the power generation system 100. The power generation system control device 1 calculates a request load of the power generation system 100 by a request load Sg1 from the load-side instrument 3. Further, the power generation system control device 1 receives suppliable hydrogen amount information Sg2 from the hydrogen generating device 2. Further, the power generation system control device 1 receives, from the engine 11, information (engine state) Sg3 of a sensor or an actuator of the engine 11. Further, the power generation system control device 1 receives an air-fuel ratio Sg4, a catalyst-inflow gas temperature (also referred to as a catalyst upstream temperature) Sg5, and an oxygen concentration Sg6 as information related to control of the three-way catalyst 20 from the air-fuel ratio sensor 17, the catalyst upstream temperature sensor 18, and the oxygen concentration sensor 19. Based on this information (Sg1), the power generation system control device 1 sends a command of an engine request output or driving ON/OFF (hereinafter, simply referred to as a request output) Sd1 to the ECU 15 of the engine 11, and controls the hydrogen supply device 14 to realize a desired hydrogen supply amount (hydrogen supply target amount) Sd2.

The ECU 15 controls an output of the engine 11 on the basis of the request output Sd1 from the power generation system control device 1. Specifically, the ECU 15 controls a natural gas fuel injecting unit, an ignition unit, a throttle valve, and a starter. The engine 11 is, for example, a four-cylinder engine using spark ignition type combustion and is an example of an internal combustion engine. By a driving force of the engine 11, the power generator 12 generates power to realize a desired power load. The power converter 13 adjusts a voltage and a phase of the power generated by the power generator 12 and supplies the adjusted power to the load-side instrument 3.

Figure 2:
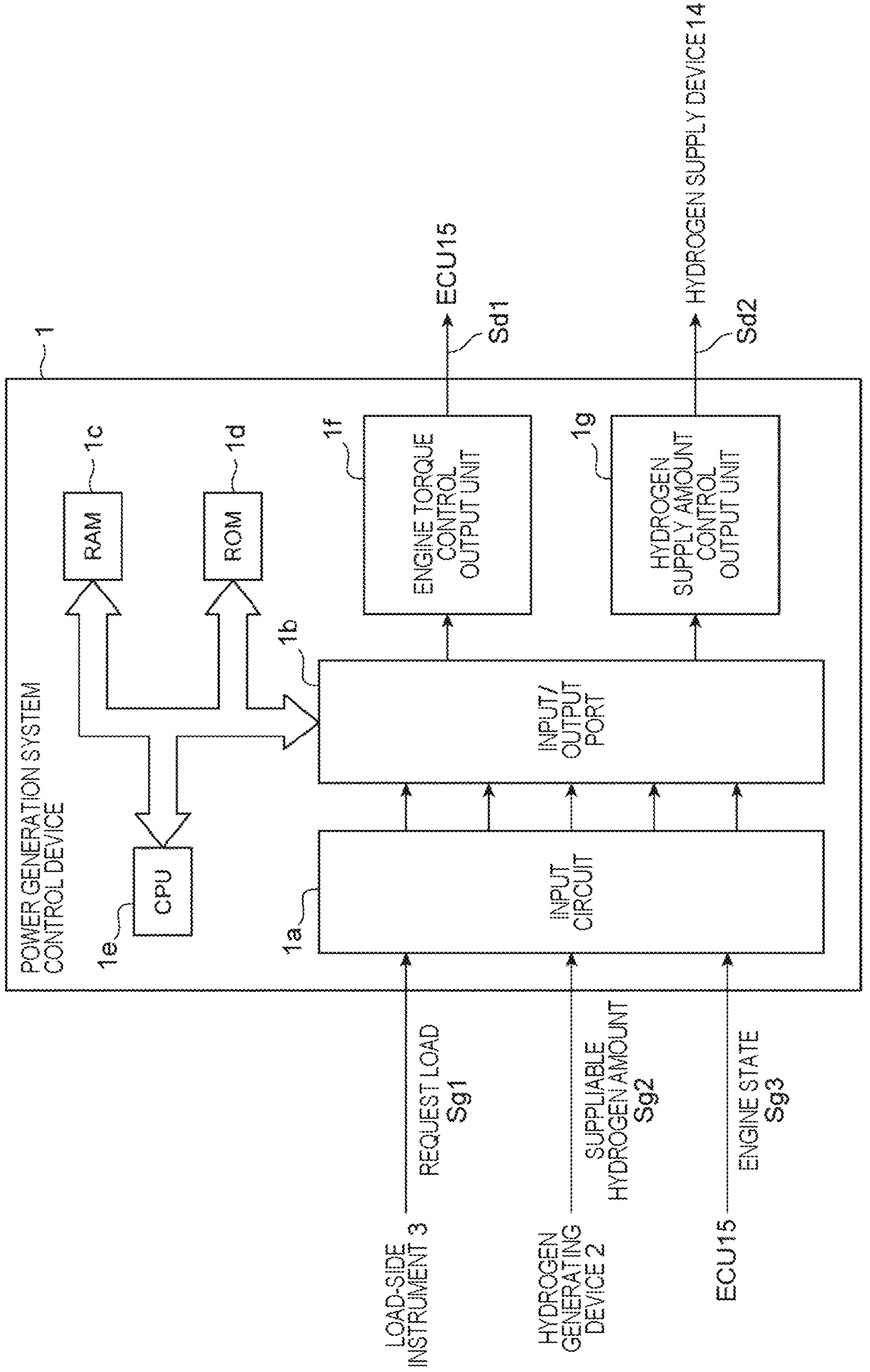
FIG. 2 is a block diagram illustrating a hardware configuration example of the power generation system control device according to the first embodiment of the present invention.

Next, an Internal Configuration Example of the Power generation system control device 1 according to the first embodiment will be described. FIG. 2 is a block diagram illustrating a hardware configuration example of the power generation system control device 1. The power generation system control device 1 is configured to use a computer device.

In FIG. 2, the request load Sg1, the suppliable hydrogen amount Sg2, and the engine state Sg3 output from the load-side instrument 3, the hydrogen generating device 2, and the ECU 15, respectively, are input to an input circuit 1*a* of the power generation system control device 1. However, an input signal is not limited thereto. Each signal input to the input circuit 1*a* is sent to an input port (not illustrated) in an input/output port 1*b*. A value sent to the input port is stored in a RAM (1*c*) and subjected to arithmetic processing by a CPU (1*e*). A control program in which details of the arithmetic processing are described is written in a ROM (1*d*) in advance.

Values indicating operation amounts of control targets (the engine 11, the hydrogen supply device 14, and the like) calculated in accordance with the control program are stored in the RAM (1*c*), then sent to an output port (not illustrated) in the input/output port 1*b*, and sent as the request output Sd1 and the desired hydrogen supply amount (hydrogen supply target amount) Sd2 to respective devices (the ECU 15 and the hydrogen supply device 14) via respective output units (an engine torque control output unit 1*f* and a hydrogen supply amount control output unit 1*g*). In FIG. 2, the engine control device (ECU 15) is separately provided in the power generation system control device 1, but the present invention is not limited to this embodiment, and a functional unit corresponding to a control device of each device may be provided in the power generation system control device 1.

Figure 3:
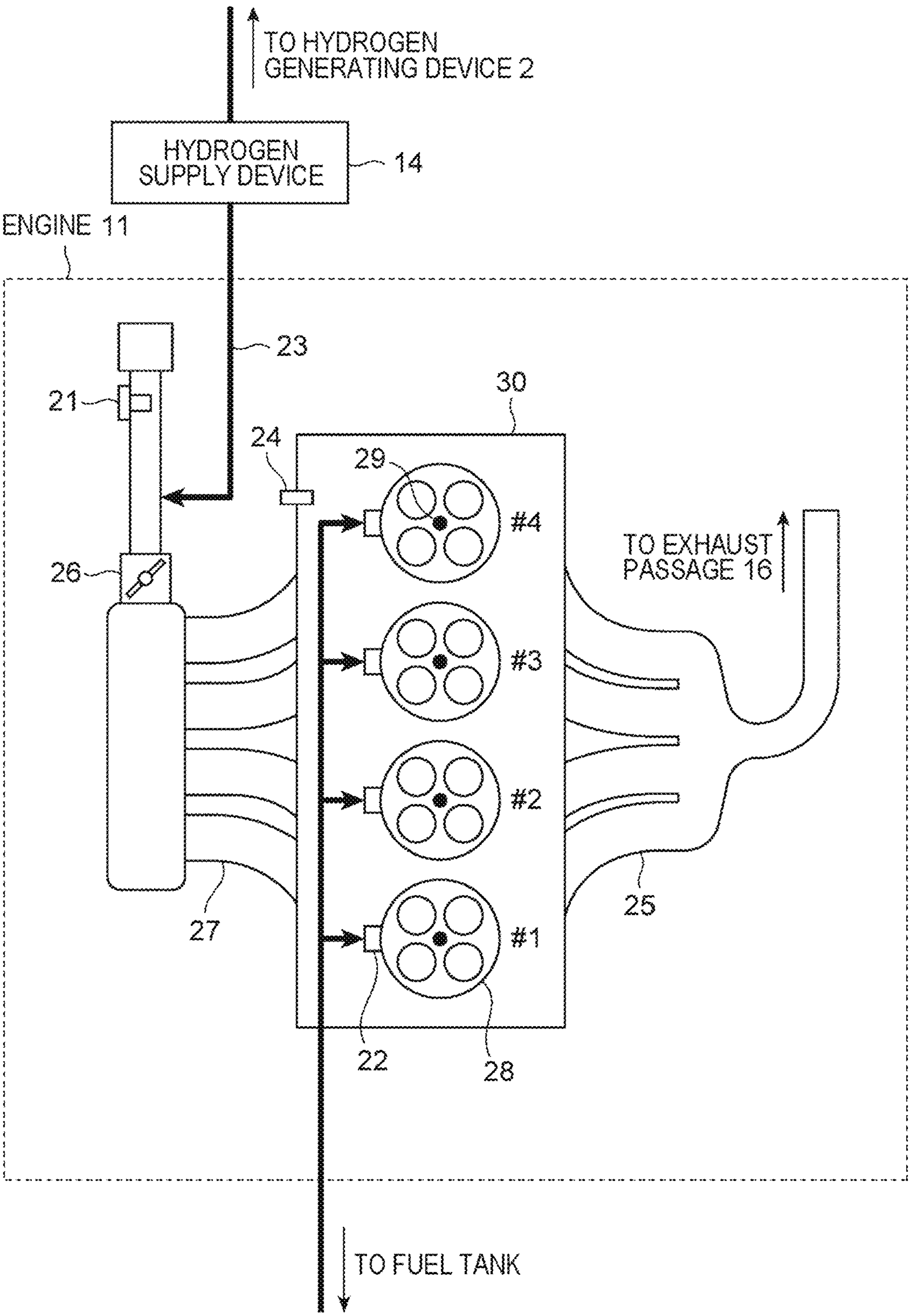
FIG. 3 is a diagram illustrating an example of an engine configuration according to the first embodiment of the present invention.

FIG. 3 is a diagram illustrating an example of a configuration of the engine 11 according to the first embodiment. The engine 11 is an engine modified to enable hydrogen to be supplied to a four-cylinder engine for a motor vehicle that performs the spark ignition type combustion. An air flow sensor 21 that measures an inlet air amount and an electronic control throttle 26 that adjusts an inlet pipe pressure are provided at respective appropriate positions of an inlet pipe 27. In addition, in the engine 11, a spark plug 29 that supplies ignition energy into a combustion chamber 28 of each cylinder is provided for each cylinder, and a cooling water temperature sensor 24 that measures a temperature of cooling water of the engine 11 is provided at an appropriate position of a cylinder head 30. An exhaust pipe 25 is connected to an exhaust passage 16.

A natural gas injecting device 22 for injecting natural gas which becomes a fuel is provided in the combustion chamber 28. The natural gas injecting device 22 is connected to a fuel tank (not illustrated) by fuel piping. Further, a hydrogen supply channel 23 for supplying hydrogen into the inlet pipe 27 is provided, and the hydrogen supply channel 23 is connected to the hydrogen supply device 14 that controls a hydrogen supply amount. The hydrogen supply device 14 is connected to the hydrogen generating device 2 by piping for hydrogen.

The above configuration makes it possible to switch between engine driving using natural gas (natural gas-only combustion), engine driving using hydrogen (hydrogen-only combustion), and engine driving using hydrogen and the natural gas at the same time (natural gas-hydrogen co-combustion).

Figure 4:
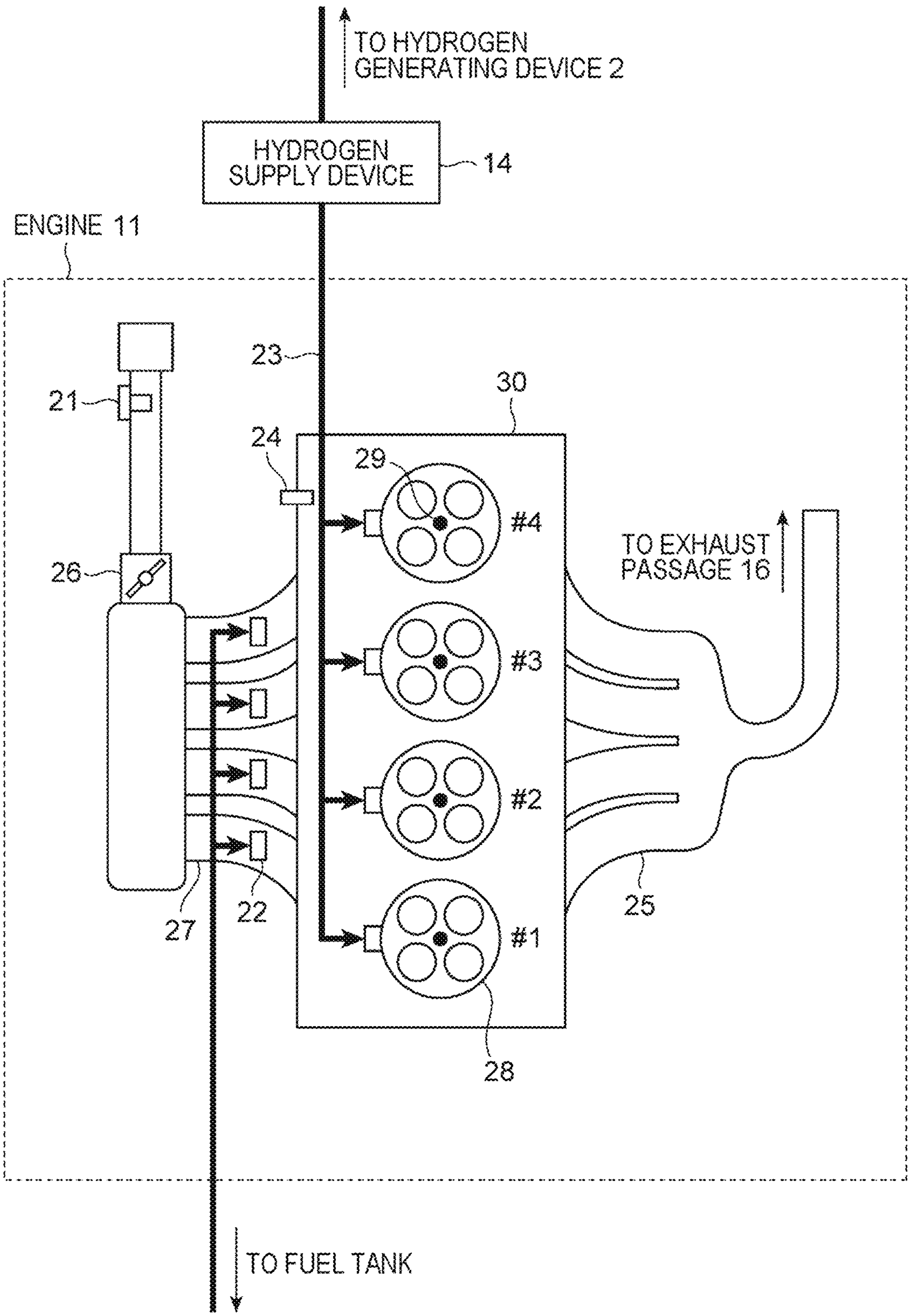
FIG. 4 is a diagram illustrating another example of the engine configuration according to the first embodiment of the present invention.

FIG. 4 is a diagram illustrating another configuration example of the engine 11 according to the first embodiment. The engine 11 is an engine modified to enable hydrogen to be supplied to a four-cylinder engine for a motor vehicle that performs the spark ignition type combustion. An air flow sensor 21 that measures an inlet air amount and an electronic control throttle 26 that adjusts an inlet pipe pressure are provided at respective appropriate positions of an inlet pipe 27. In addition, in the engine 11, a spark plug 29 that supplies ignition energy into a combustion chamber 28 of each cylinder is provided for each cylinder, and a cooling water temperature sensor 24 that measures a temperature of cooling water of the engine 11 is provided at an appropriate position of a cylinder head 30. An exhaust pipe 25 is connected to an exhaust passage 16.

The natural gas injecting device 22 for injecting natural gas which becomes a fuel is provided in the inlet pipe 27. The natural gas injecting device 22 is connected to a fuel tank (not illustrated) by fuel piping. Further, the hydrogen supply channel 23 for supplying hydrogen into the combustion chamber 28 is provided, and the hydrogen supply channel 23 is connected to the hydrogen supply device 14 that controls the hydrogen supply amount. The hydrogen supply device 14 is connected to the hydrogen generating device 2 by piping for hydrogen.

The above configuration makes it possible to switch between engine driving using natural gas (natural gas-only combustion), engine driving using hydrogen (hydrogen-only combustion), and engine driving using hydrogen and the natural gas at the same time (natural gas-hydrogen co-combustion).

Hereinafter, an embodiment of the present invention will be described. First, key points of control in the present embodiment will be described, and then specific processing of the present embodiment will be described.

First, key points in control will be described from the viewpoint of prompt activation of the catalyst and prompt warmed-up of the engine. Conditions illustrated in FIGS. 5 to 7 are natural gas-only combustion conditions and natural gas-hydrogen co-combustion conditions and are the same for each condition, with an engine rotation speed and a graphical average effective pressure being constant, the air-fuel ratio being the theoretical air-fuel ratio, and an ignition timing being an optimum ignition timing.

Figure 5:
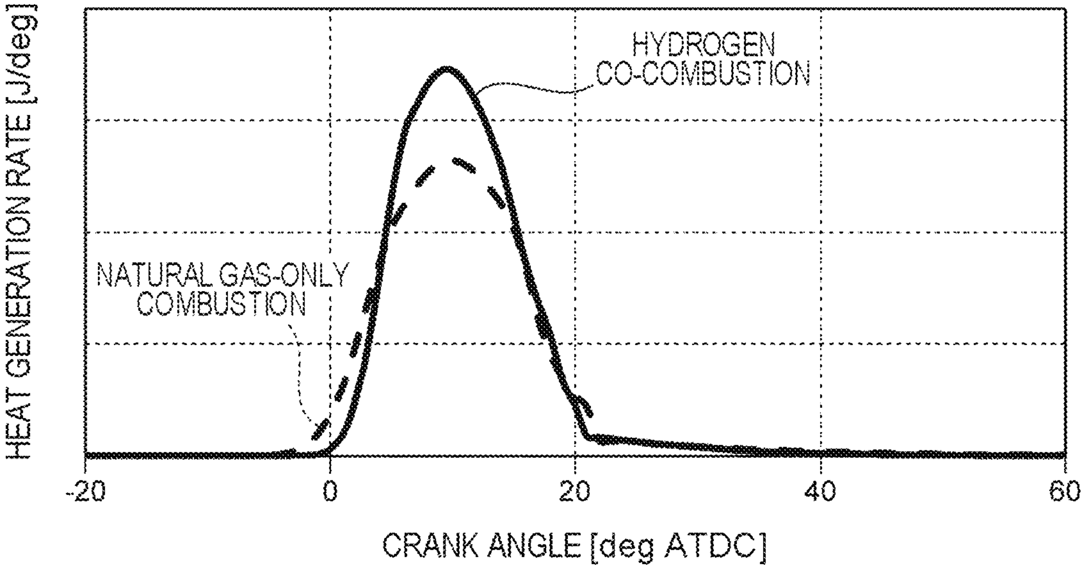
FIG. 5 is a graph illustrating heat generation histories in a natural gas-only combustion condition and a hydrogen co-combustion condition according to the first embodiment of the present invention.

FIG. 5 illustrates heat generation histories in the natural gas-only combustion condition and the hydrogen co-combustion condition. The horizontal axis represents a crank angle, and the vertical axis represents a heat generation rate. FIG. 5 is the heat generation histories in the vicinity of a compression top dead center in a compression-expansion stroke. As can be understood from FIG. 5, the hydrogen co-combustion results in a rapid increase in heat generation. This is mainly because a laminar combustion velocity of hydrogen is significantly higher than that of natural gas containing methane as a main component.

Figure 6:
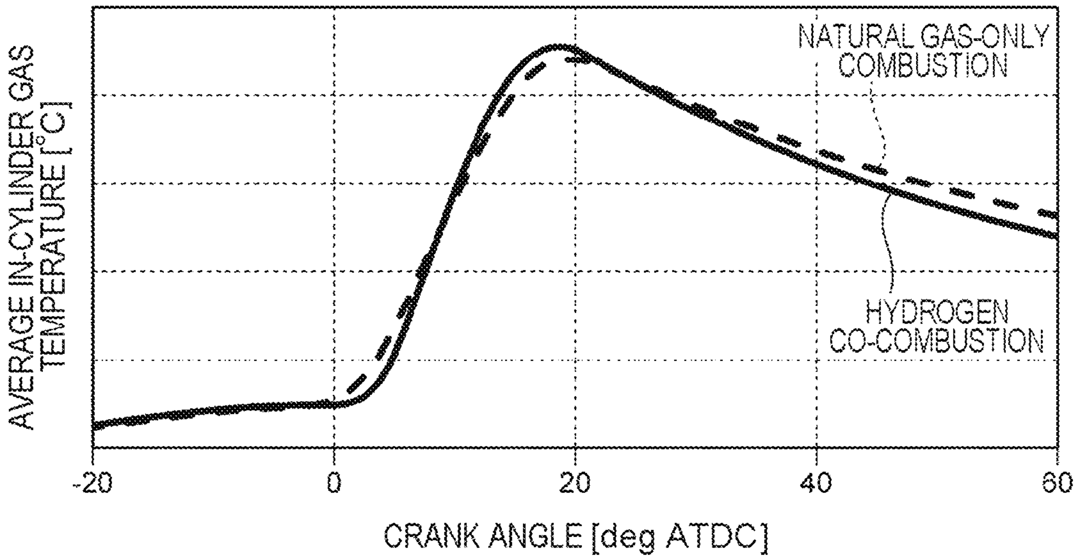
FIG. 6 is a graph illustrating average in-cylinder gas temperature histories in the natural gas-only combustion condition and the hydrogen co-combustion condition according to the first embodiment of the present invention.

FIG. 6 is a graph illustrating average in-cylinder gas temperature histories in the natural gas-only combustion condition and the hydrogen co-combustion condition. As can be understood from FIG. 6, as a result of the rapid increase in heat generation due to the hydrogen co-combustion, a timing when the average in-cylinder gas temperature reaches a maximum temperature comes promptly, and from 30 deg ATDC, the average in-cylinder gas temperature is lower than that in the natural gas-only combustion condition.

Figure 7:
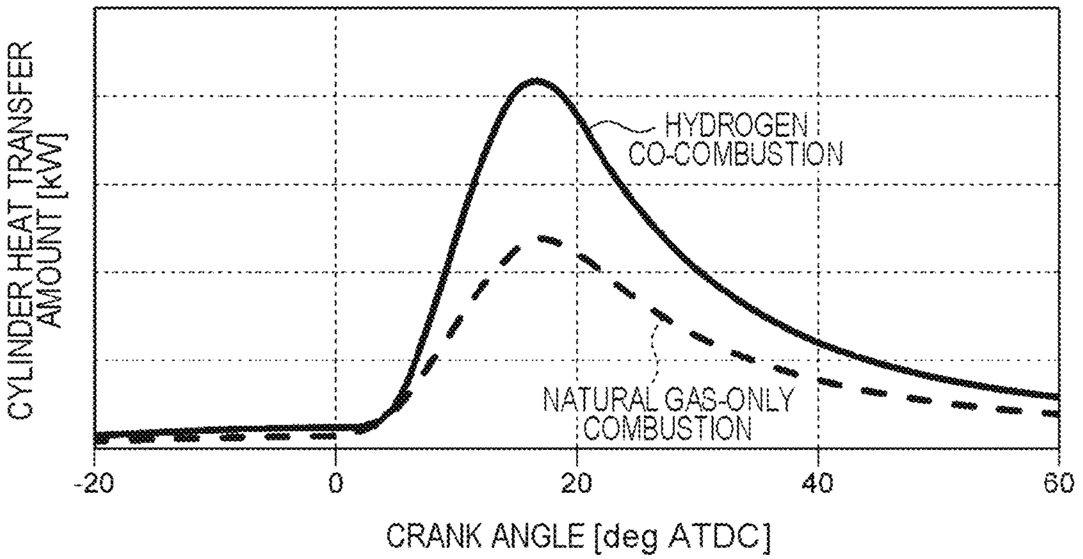
FIG. 7 is a graph illustrating a heat transfer amount from gas in a cylinder to an engine cylinder according to the first embodiment of the present invention.

FIG. 7 illustrates a heat transfer amount (hereafter, a cylinder heat transfer amount) from gas in a cylinder to an engine cylinder. The cylinder heat transfer amount is increased by the hydrogen co-combustion. This is presumed to be because, in the combustion of hydrogen having a significant combustion speed as compared with that of the natural gas, the cylinder heat transfer amount is affected by a significant gas flow generated due to the flame propagation and high gas convection near a wall surface of the combustion chamber due to a flame surface rapidly reaching the wall surface.

As described above, it is effective to perform the natural gas-only combustion in order to increase an exhaust temperature from the viewpoint of prompt activation of the catalyst, and it is effective to increase a hydrogen mixing proportion in order to increase the cylinder heat transfer amount from the viewpoint of the prompt warmed-up of the engine.

Next, points of control in a condition after the catalyst is activated and the engine is warmed up will be described.

Figure 8:
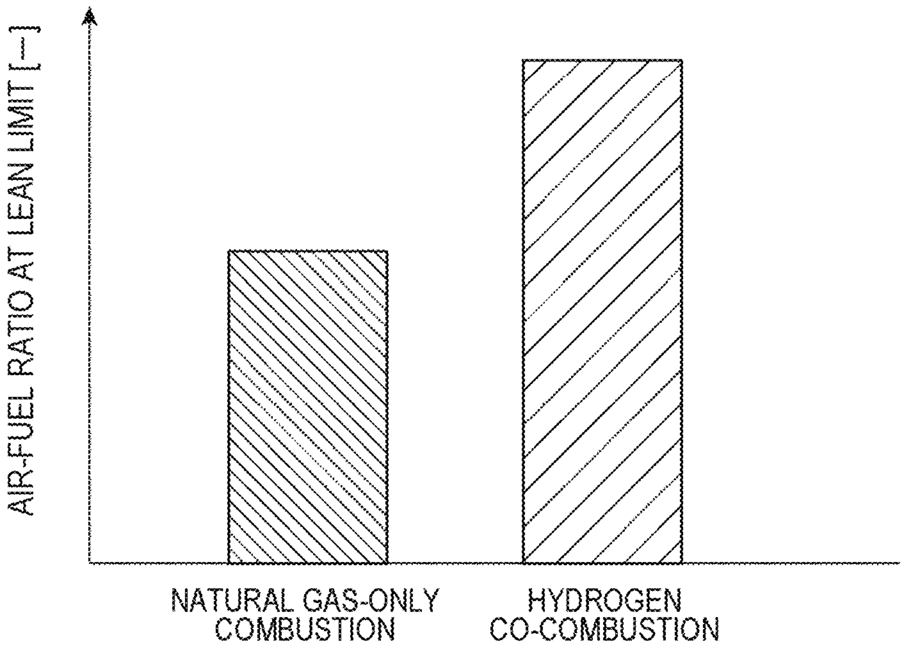
FIG. 8 is a graph illustrating lean limits of the natural gas-only combustion condition and the hydrogen co-combustion condition according to the first embodiment of the present invention.

FIG. 8 illustrates lean limits of the natural gas-only combustion condition and the hydrogen co-combustion condition. Here, the lean limit indicates an air-fuel ratio when combustion stability of the engine reaches an allowable limit. As can be understood from FIG. 8, the lean limit is increased in the hydrogen co-combustion condition as compared with the natural gas-only combustion condition. This is because the laminar flow combustion rate of hydrogen is significantly higher than that of the natural gas.

Figure 9:
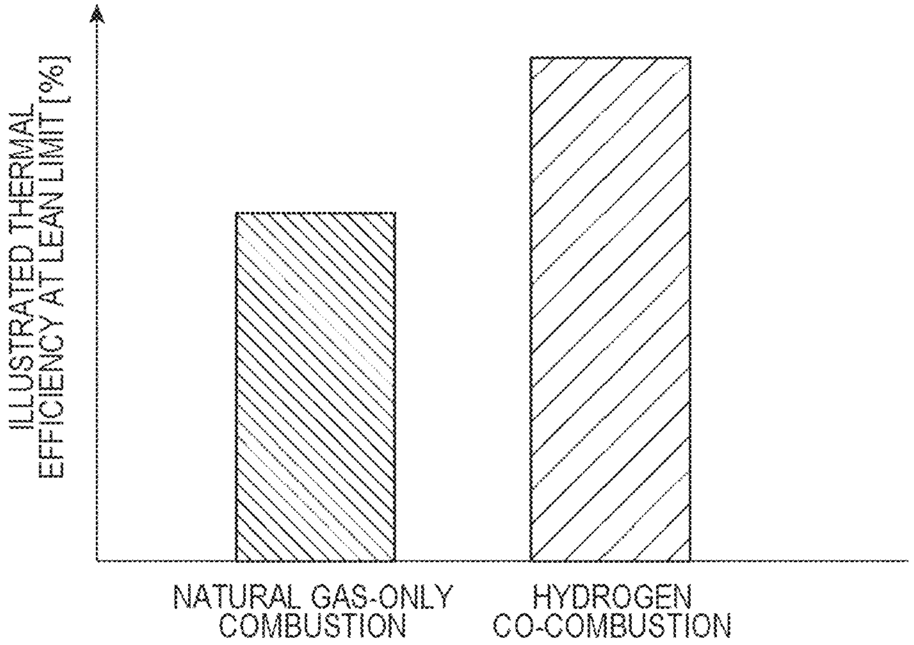
FIG. 9 is a graph illustrating graphical thermal efficiency at the lean limit according to the first embodiment of the present invention.

FIG. 9 illustrates graphical thermal efficiency at the lean limit. As can be understood from FIG. 9, the graphical thermal efficiency at the lean limit is increased in the hydrogen co-combustion condition as compared with the natural gas-only combustion condition. This is mainly because a combustion gas temperature decreases due to an increase in degree of lean, and as a result, a cooling loss decreases.

Figure 10:
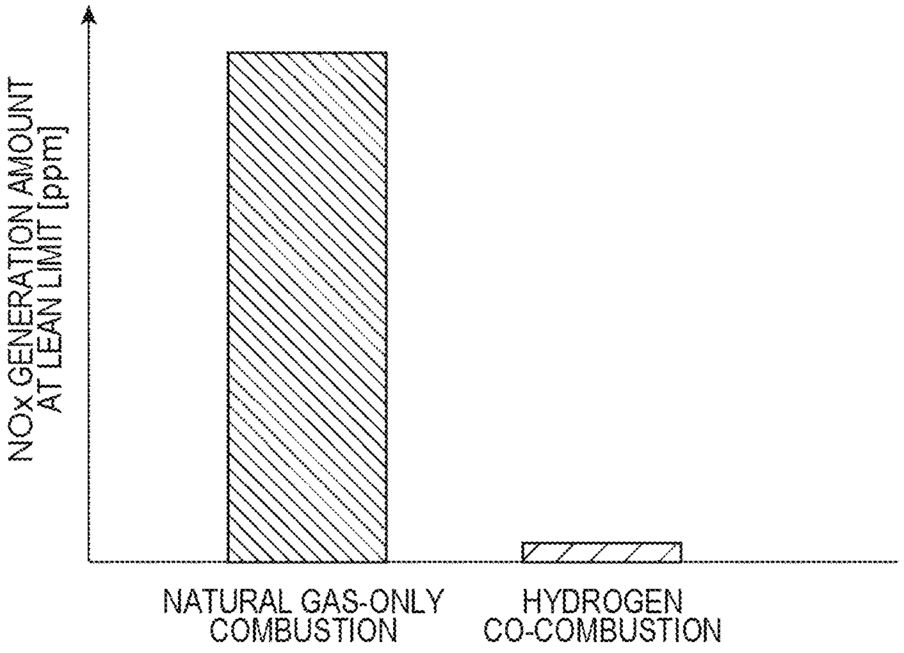
FIG. 10 is a graph illustrating an NOx generation amount at the lean limit according to the first embodiment of the present invention.

FIG. 10 illustrates an NOx generation amount at the lean limit. As can be understood from FIG. 10, the NOx generation amount at the lean limit is significantly decreased in the hydrogen co-combustion condition as compared with that in the natural gas-only combustion condition. This is mainly because the combustion gas temperature is decreased, so that generation of thermal NOx generated by reaction of nitrogen and oxygen in a high-temperature state can be reduced.

As described above, it is effective to perform hydrogen co-combustion and lean combustion under a condition after the catalyst is activated and the engine is warmed up.

Based on the key points of the control described above, in the present embodiment, a hydrocarbon-based fuel supply amount or the hydrogen supply amount to the engine is controlled based on an active state of the catalyst and a warmed-up state of the engine. Specifically, as illustrated in FIG. 11, there are provided three operation modes, in which the hydrogen mixing proportions and the air-fuel ratios are different, and control of switching the operation modes is performed depending on the active state of the catalyst and the warmed-up state of the engine. Here, the hydrogen mixing proportion is a proportion of the amount of hydrogen to a total amount of fuels (natural gas and hydrogen) supplied to the engine. The proportion is a heat generation proportion, a volume proportion, a mass proportion, or the like, and may be appropriately selected. Details of the operation modes will be described below.

Mode 1

In the condition that the catalyst is inactive, only the hydrocarbon-based fuel is supplied to the engine, and hydrocarbon-based fuel-only combustion is performed. This enables the exhaust temperature to be increased and enables the catalyst to be activated promptly. Ignition delay control may also be executed. This enables the exhaust temperature to be increased and enables the activation of the catalyst to be realized more promptly. In addition, the air-fuel ratio of the engine is controlled so that an oxygen concentration of an exhaust gas flowing into the catalyst becomes equal to or lower than a predetermined value C1. The predetermined value C1 is an oxygen concentration of the exhaust gas in a case where the engine is operated in which the air-fuel ratio of the engine is the theoretical air-fuel ratio (stoichiometric). The air-fuel ratio of the engine does not need to be strictly stoichiometric as long as the ratio between reactive components (HC, NOx, CO, and $H_2$) is controlled within a range of a window of the catalyst in which the ratio becomes a stoichiometrically ideal value. This enables purification to be performed by removing harmful gas components (HC, CO, and NOx) in the exhaust gas by the catalyst.

Mode 2

In the condition that the catalyst is active and the engine is cold, the hydrocarbon-based fuel and hydrogen are supplied to the engine, and hydrogen co-combustion is performed. This enables the cylinder heat transfer amount to be increased and enables the engine to be warmed up promptly. In addition, the air-fuel ratio of the engine is controlled so that an oxygen concentration of an exhaust gas flowing into the catalyst becomes equal to or lower than a predetermined value C1. The predetermined value C1 is an oxygen concentration of the exhaust gas in a case where the engine is operated in which the air-fuel ratio of the engine is the theoretical air-fuel ratio (stoichiometric). The air-fuel ratio may be controlled to fall within the range of the window of the catalyst, and does not need to be strictly stoichiometric. In particular, in the hydrogen co-combustion condition, the combustion is heated to a high temperature, the NOx generation amount is increased, an $H_2$ generation amount is increased due to an increase in the hydrogen supply amount, and on the other hand, the generation amounts of CO and THC tend to be decrease due to a decrease in the hydrocarbon-based fuel supply amount. Hence, a relationship between the air-fuel ratio and an exhaust gas composition in the hydrogen co-combustion condition may be acquired in advance, and the air-fuel ratio may be controlled so that the ratio between the reactive components (HC, NOx, CO, and $H_2$) become a stoichiometrically ideal value. This enables purification to be performed by removing harmful gas components (HC, CO, and NOx) in the exhaust gas by the catalyst.

Mode 3

In the condition that the catalyst is active and the engine is warmed up, the hydrocarbon-based fuel and hydrogen are supplied to the engine, and the hydrogen co-combustion is performed. This enables the lean limit to increase. In addition, the air-fuel ratio of the engine is controlled so that the oxygen concentration of the exhaust gas flowing into the catalyst becomes equal to or higher than a predetermined value C2. The predetermined value C2 is an oxygen concentration of the exhaust gas in a lean condition in which the air-fuel ratio of the engine can be reduced to be equal to or smaller than a value by which the amount of NOx generated from the engine can sufficiently satisfy an exhaust regulation value even without using a post-processing device (in other words, in a case where the engine is operated at an air-fuel ratio at which an amount of nitrogen oxides directly emitted from the engine is equal to or smaller than a predetermined value). This enables NOx emitted from the engine to be reduced and enables purification to be performed by removing CO and HC by the catalyst with high efficiency.

Subsequently, specific processing of the present embodiment will be described.

Figure 12:
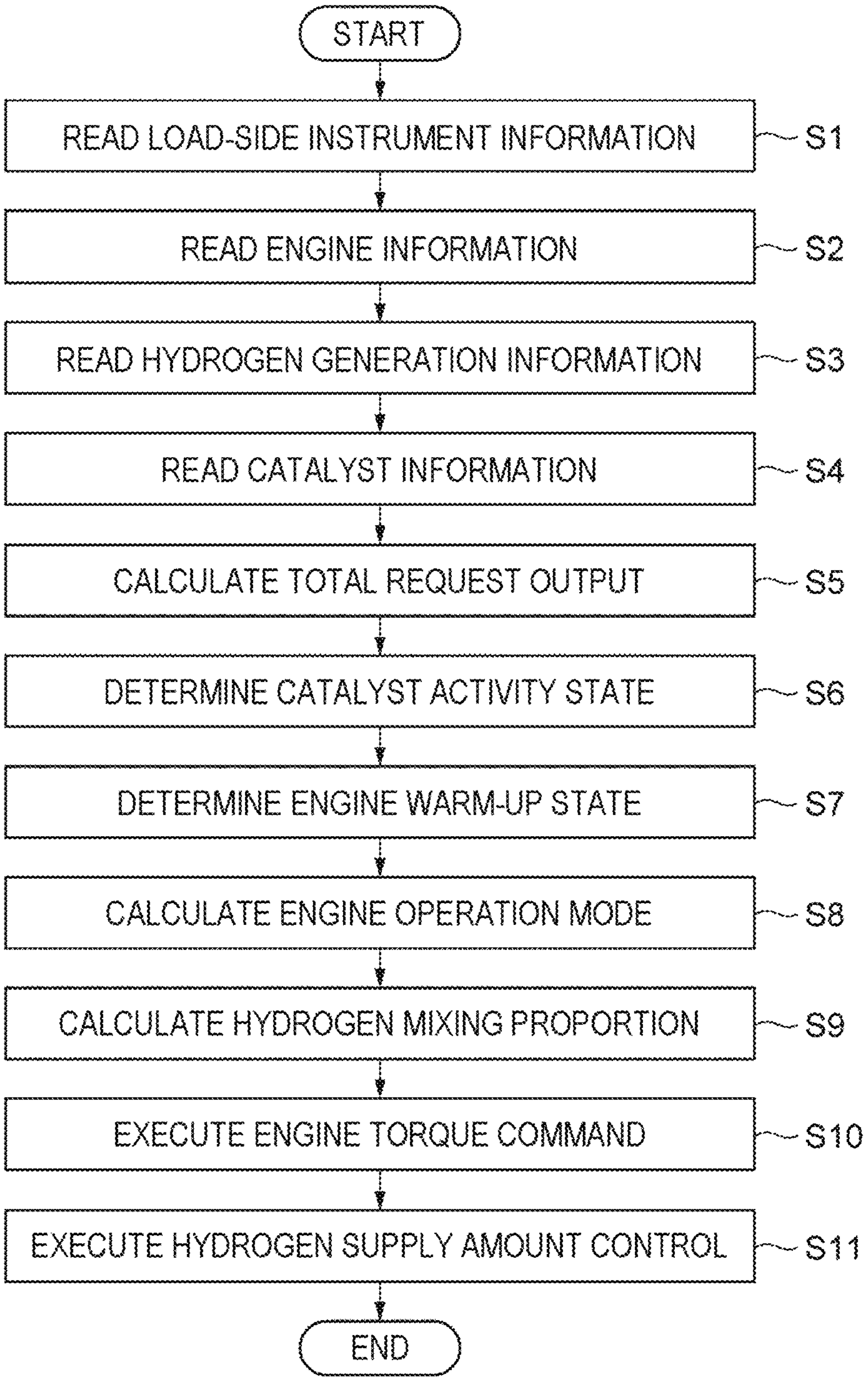
FIG. 12 is a diagram illustrating an example of a flowchart of engine power generator control according to the first embodiment of the present invention.

FIG. 12 illustrates an example of a flowchart of engine power generator control according to the present embodiment. Details of each step will be described below.

Step S1

In step S1, the power generation system control device 1 first reads information (request load) Sg1 from the connected load-side instrument 3. The information (request load) Sg1 from the load-side instrument 3 is, for example, current power consumption (a voltage and a current) or a future prediction value of an instrument which occurs on the load side. In addition, in a case where the output of the power generation system 100 is connected to a power system, the information Sg1 becomes a current or future power request value from the system side.

Step S2

In step S2, the power generation system control device 1 reads, from the ECU 15 or the engine 11, information (engine state) Sg3 of the engine 11. The information (engine state) Sg3 from the ECU 15 or the engine 11 is, for example, an engine state such as a current engine rotation speed or torque or an engine temperature (a cooling water temperature, an inlet temperature, or the like) or engine specifications (an exhaust amount, a compression ratio, a fuel supply position, or the like).

Step S3

In step S3, the power generation system control device 1 reads the hydrogen generation information (suppliable hydrogen amount) Sg2 from the hydrogen generating device 2. Here, the hydrogen generating device 2 is, for example, a water electrolyzer that generates hydrogen from renewable energy, and the power generation system control device 1 reads information such as power that can be input to the water electrolyzer or output efficiency.

Step S4

In step S4, the power generation system control device 1 reads information related to control of the catalyst from the air-fuel ratio sensor 17, the catalyst upstream temperature sensor 18, or the oxygen concentration sensor 19. The information related to the control of the catalyst is the air-fuel ratio Sg4, the catalyst-inflow gas temperature (catalyst upstream temperature) Sg5, or the oxygen concentration Sg6.

Step S5

In step S5, the power generation system control device 1 calculates a total request output requested to the power generation system 100, based on the information (request load) Sg1 from the load-side instrument 3. Here, the total request output to the engine is calculated in consideration of loss or the like in the power converter 13 and the power generator 12.

Step S6

In step S6, the power generation system control device 1 determines an active state of the catalyst based on the catalyst-inflow gas temperature Sg5. Here, when a catalyst-inflow gas temperature Tc is equal to or higher than a predetermined temperature Tc0, the power generation system control device 1 determines that the catalyst is an active state. When the catalyst-inflow gas temperature Tc is lower than the predetermined temperature Tc0, the power generation system control device 1 determines that the catalyst is in an inactive state. In this manner, the active state of the catalyst can be accurately determined by determining a temperature of gas in the vicinity of the catalyst based on a directly detected value. That is, in the present embodiment, the power generation system control device 1 includes a catalyst active state detecting unit that detects whether the catalyst is in the active state. The catalyst active state detecting unit detects a temperature of gas flowing into the catalyst (a catalyst-inflow gas temperature) (from the catalyst-inflow gas temperature measured by the catalyst upstream temperature sensor 18), and determines that the catalyst is in the active state when the catalyst-inflow gas temperature is equal to or higher than a predetermined value. However, means for detecting whether the catalyst is in the active state is not limited thereto.

Step S7

In step S7, the power generation system control device 1 determines the warmed-up state of the engine based on the information (engine state) Sg3 from the ECU 15 and the engine 11. Here, when an engine cooling water temperature Tw is equal to or higher than a predetermined temperature Tw1, the power generation system control device 1 determines that the engine is warmed up. When the engine cooling water temperature Tw is lower than the predetermined temperature Tw1, the power generation system control device 1 determines that the engine is cold. In this manner, since the determination is made based on a value obtained by directly detecting a cooling water temperature of the engine, the warmed-up state of the engine can be accurately determined. That is, in the present embodiment, the power generation system control device 1 includes an engine warmed-up state detecting unit that detects whether the engine is in the warmed-up state. The engine warmed-up state detecting unit detects the cooling water temperature of the engine (from the cooling water temperature measured by the cooling water temperature sensor 24), and determines that the engine is in the warmed-up state when the cooling water temperature of the engine is equal to or higher than a predetermined value. However, means for detecting whether the engine is in the warmed-up state is not limited thereto.

Step S8

In step S8, the power generation system control device 1 calculates an operation mode of the engine based on the active state of the catalyst and the warmed-up state of the engine determined in steps S6 and S7. Here, of the operation modes illustrated in FIG. 11, a corresponding operation mode is set. When the catalyst is inactive (in other words, when the catalyst active state detecting unit detects that the catalyst is inactive), Mode 1 (in which only the hydrocarbon-based fuel is supplied to the engine, and the hydrocarbon-based fuel-only combustion is performed) is set. This enables the exhaust temperature to be increased and enables the catalyst to be activated promptly. When the catalyst is active and the engine is cold (in other words, when the catalyst active state detecting unit detects that the catalyst is active and the engine warmed-up state detecting unit detects that the engine is cold), Mode 2 (in which the hydrocarbon-based fuel and hydrogen are supplied to the engine, and the hydrogen co-combustion is performed) is set. This enables the cylinder heat transfer amount to be increased and enables the engine to be warmed up promptly. When the catalyst is active and the engine is warmed up (in other words, when the catalyst active state detecting unit detects that the catalyst is active and the engine warmed-up state detecting unit detects that the engine is warmed up), Mode 3 (in which the hydrocarbon-based fuel and hydrogen are supplied to the engine, and the hydrogen co-combustion is performed) is set. This enables NOx emitted from the engine to be reduced and enables purification to be performed by removing CO and HC by the catalyst with high efficiency.

Step S9

In step S9, the power generation system control device 1 calculates the hydrogen mixing proportion based on the operation mode calculated in step S8. At this time, a hydrogen requirement amount of the power generation system 100 is set to be equal to or not to exceed a hydrogen generable amount obtained from the hydrogen generating device 2. For example, the hydrogen mixing proportion is calculated by setting, in advance, a hydrogen mixing proportion with respect to the hydrogen generable amount obtained from the hydrogen generating device 2 for each operation mode and storing the set hydrogen mixing proportion in the ROM of the power generation system control device 1. For example, by setting the hydrogen mixing proportion to increase as the hydrogen generable amount increases, the engine warmed-up can be further promoted in a condition in which the hydrogen generable amount is large in Mode 2, and the engine can be operated in a more lean condition in a condition in which the hydrogen generable amount is large in Mode 3, so that the engine can be operated with high efficiency.

In addition, in Mode 2, the hydrogen mixing proportion is set so that the hydrogen mixing proportion increases as the engine cooling water temperature decreases. In other words, in Mode 2 (when the engine warmed-up state detecting unit detects that the engine is cold), the hydrocarbon-based fuel supply amount or the hydrogen supply amount to the engine is set (controlled) such that a proportion of a hydrogen amount to a total fuel supply amount decreases as the cooling water temperature of the engine increases. This enables the hydrogen mixing proportion to increase as the cooling water temperature of the engine decreases, and the cylinder heat transfer amount increases, and thus the engine warmed-up can be promoted.

Step S10

In step S10, the power generation system control device 1 sends, as the engine torque command value (request output) Sd1, the total request output calculated in step S5 to the ECU 15 and executes a torque command.

Step S11

In step S11, the power generation system control device 1 executes hydrogen supply amount control to realize a hydrogen co-combustion proportion of the engine calculated in step S9. The hydrogen supply amount command value (hydrogen supply target amount) Sd2 is sent to the hydrogen supply device 14, and a series of control is ended.

Figure 13:
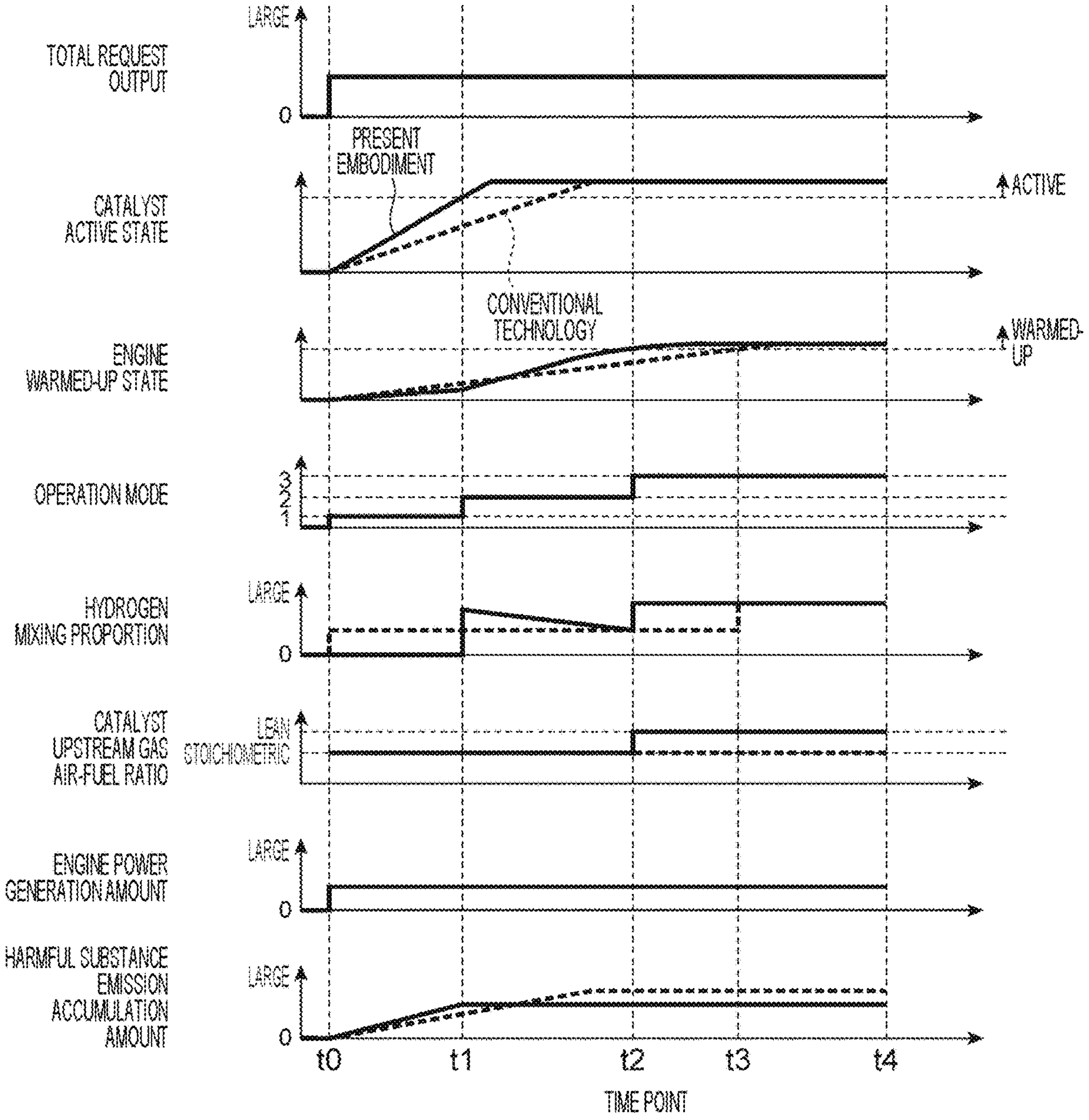
FIG. 13 is a time chart of a scene in which a catalyst is inactive and an engine starts in a condition of being cold according to the first embodiment of the present invention.

FIG. 13 is a time chart of a scene in which the catalyst is inactive and the engine starts in the condition of being cold in the present embodiment. The vertical axis represents, from the top, the total request output, the catalyst active state, the engine warmed-up state, the operation mode, the hydrogen mixing proportion, the catalyst upstream gas air-fuel ratio, the engine power generation amount, and the harmful substance emission accumulation amount, and the horizontal axis represents time. A solid line represents the present embodiment, and a broken line represents the conventional technology.

In FIG. 13, at a time point to, information is received from the load-side instrument, and a total request output is calculated. At this time, since the condition is set in which the catalyst is inactive and the engine is cold, in the present embodiment, the operation mode is set to Mode 1, the hydrogen mixing proportion is set to 0, and the air-fuel ratio is set to be stoichiometric. Thereafter, at a time point t1, since the condition is set in which the catalyst is active and the engine is cold, in the present embodiment, the operation mode is set to Mode 2, the hydrogen mixing proportion is set to the predetermined value, and the air-fuel ratio is set to be stoichiometric. When the catalyst is activated, harmful substances are removed by purification, and the harmful substance emission accumulation amount becomes substantially constant thereafter. In addition, since the hydrogen mixing proportion is set to increase as the engine is in a cold state (although not illustrated, as the engine cooling water temperature decreases), warmed-up of the engine is promoted. Thereafter, at a time point t2, since the condition is set in which the catalyst is active and the engine is warmed up, in the present embodiment, the operation mode is set to Mode 3, the hydrogen mixing proportion is set to the predetermined value, and the air-fuel ratio is set to be lean. On the other hand, in the conventional technology, since the hydrogen co-combustion is performed regardless of the active state of the catalyst, the exhaust temperature decreases and the activation of the catalyst is delayed. Accordingly, the harmful substances are emitted without being purified until the catalyst is activated, and as a result, the harmful substance emission accumulation amount increases.

Although a method of starting the engine is not described in the present embodiment, the air-fuel ratio may be set to be rich and the combustion may be stabilized in a period from cranking of the engine to stabilization of the combustion. In addition, by performing the hydrogen co-combustion or the hydrogen-only combustion at the time of starting, stable combustion can be performed as compared with hydrocarbon-based fuel-only combustion, and emissions of uncombusted substances such as CO and THC can be reduced.

In the present embodiment, the active state of the catalyst is directly detected by the catalyst upstream temperature sensor 18, but the active state of the catalyst can also be estimated based on an operation state of the engine (for example, an inlet air amount, a fuel supply amount, an ignition timing, an engine rotation speed, or the like).

In addition, in the present embodiment, the air-fuel ratio of the engine is obtained from the output value of the air-fuel ratio sensor 17, but may be calculated based on the inlet air amount and a fuel injection amount detected by the air flow sensor 21.

As is clear from the above description, the present embodiment is the engine power generation system control device (power generation system control device 1) for the engine power generation system (power generation system 100) that is capable of performing co-combustion when supplying the hydrocarbon-based fuel and hydrogen and performs power generation by that engine including the engine warmed-up detecting unit which detects whether the engine is in the warmed-up state, the engine power generation system control device (power generation system control device 1) including: the catalyst which is provided in the exhaust passage of the engine and purifies the exhaust gas; and the catalyst active state detecting unit that detects whether the catalyst is in the active state. The hydrocarbon-based fuel supply amount or the hydrogen supply amount (specifically, proportions of the supply amounts of the hydrocarbon-based fuel and hydrogen supplied to the engine) to the engine is controlled based on the catalyst active state detected by the catalyst active state detecting unit and the warmed-up state of the engine detected by the engine warmed-up state detecting unit. This enables prompt activation of the catalyst and prompt warmed-up of the engine, and as a result, a harmful substance emission amount from the power generation system 100 can be reduced.

Second Embodiment

A second embodiment in the present invention will be described. In the present embodiment, a method of applying the power generation system control device according to the present invention to the power generation system including a plurality of engine power generators using hydrogen and natural gas as fuels is described. The configurations of the first embodiment are applied to configurations of the second embodiment to be described below except for configurations which differ from the configurations described in the first embodiment.

Figure 14:
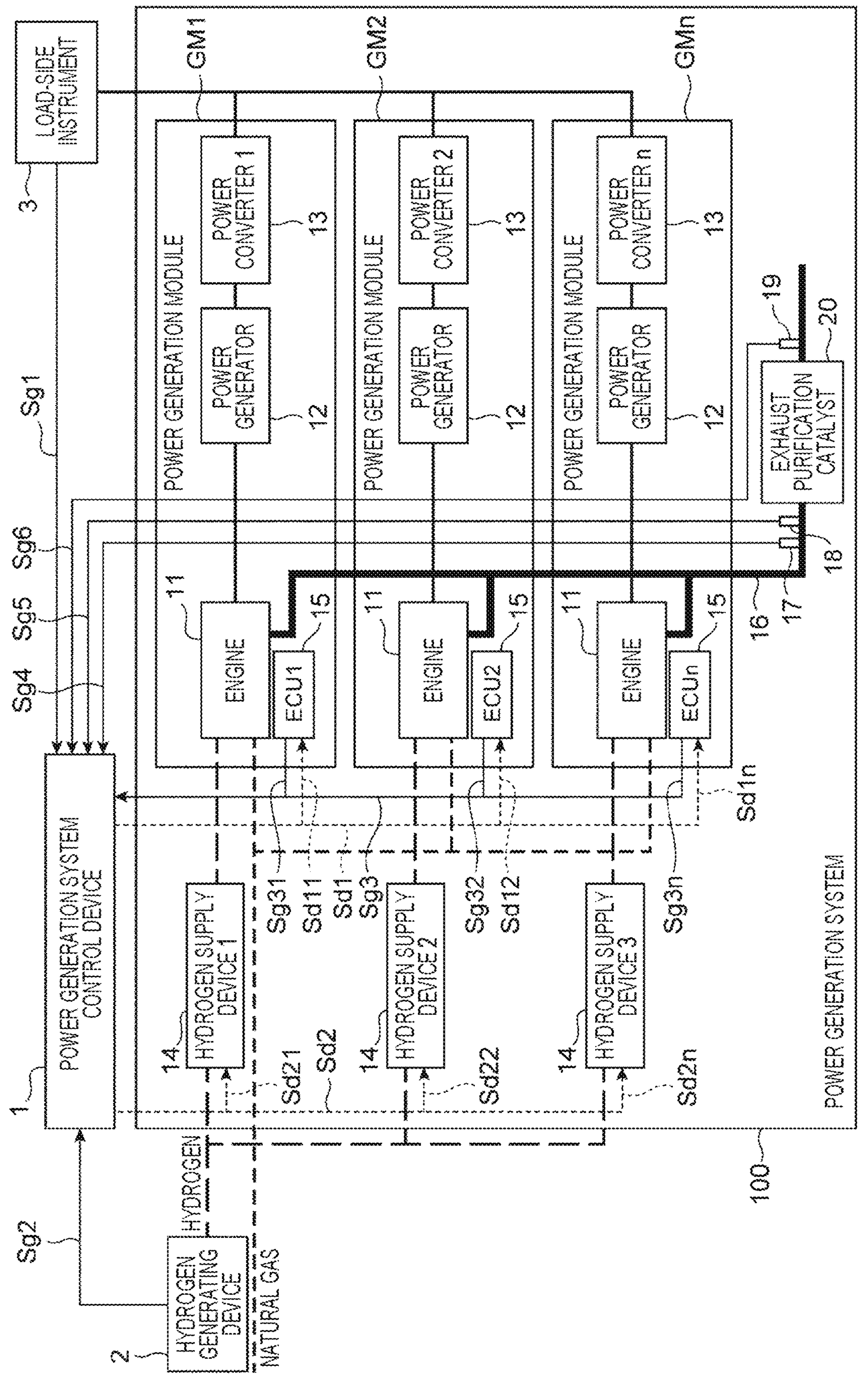
FIG. 14 is a schematic configuration diagram illustrating an example in which a power generation system control device is applied to a power generation system including a plurality of engine power generators using hydrogen and natural gas as fuels according to a second embodiment of the present invention.

FIG. 14 is a schematic configuration diagram illustrating an example in which a power generation system control device is applied to a power generation system including a plurality of engine power generators using hydrogen and natural gas as fuels according to the second embodiment of the present invention.

A power generation system 100 includes a plurality of sets of power generation modules GM connected in parallel (GM1 to GMn) including an engine 11, a power generator 12, and a power converter 13, and the engine 11 includes an electronic control unit (ECU) 15 for controlling each engine 11. The engine 11 is connected to a hydrogen generating device 2 via a hydrogen supply device 14 and can supply a hydrogen fuel. In addition, although not illustrated, the engine is connected to a fuel tank and can supply natural gas, thereby enabling combustion to be performed by hydrogen, natural gas, or a mixed fuel of hydrogen and natural gas. Outputs of the power generation modules GM (GM1 to GMn) are electrically connected to a load-side instrument 3.

As a minimum configuration of the power generation module GM which is applicable to the present invention, the engine 11 and the power generator 12 need to be included, and the power converter 13 may be appropriately included depending on whether a load is an AC load or a DC load. In addition, the power generator 12 may be either an AC generator or a DC generator.

Exhaust pipes of the engines 11 converge to an exhaust passage 16. Further, a three-way catalyst 20 as an exhaust purification catalyst for purifying the exhaust gas, a catalyst upstream temperature sensor 18 that measures a temperature (catalyst-inflow gas temperature) of a gas flowing into the three-way catalyst 20, an air-fuel ratio sensor 17 that is an aspect of an air-fuel ratio detector and detects an air-fuel ratio of the exhaust gas on a side upstream of the three-way catalyst 20, and an oxygen concentration sensor 19 that detects an oxygen concentration of the exhaust gas on a side downstream of the three-way catalyst 20 are provided at respective appropriate positions of the exhaust passage 16 to which the exhaust pipes of the respective engines 11 have converged.

A power generation system control device 1 is mounted on the power generation system 100. The power generation system control device 1 calculates a request load of the power generation system 100 by a request load Sg1 from the load-side instrument 3. Further, the power generation system control device 1 receives suppliable hydrogen amount information Sg2 from the hydrogen generating device 2. Further, the power generation system control device 1 receives, from the engine 11, items of information (engine states) Sg3 (Sg31 to Sg3*n*) of sensors or actuators of the respective engines 11. Further, the power generation system control device 1 receives an air-fuel ratio Sg4, a catalyst-inflow gas temperature (catalyst upstream temperature) Sg5, and an oxygen concentration Sg6 as information related to control of the three-way catalyst 20 from the air-fuel ratio sensor 17, the catalyst upstream temperature sensor 18, and the oxygen concentration sensor 19. Based on these items of information (Sg1, Sg2, and Sg3), the power generation system control device 1 sends commands of engine request outputs or driving ON/OFF (hereinafter, simply referred to as request outputs) Sd1 (Sd11 to Sd1*n*) to the ECU 15 of the respective engines 11, and controls the hydrogen supply device 14 to realize desired hydrogen supply amounts (hydrogen supply target amounts) Sd2 (Sd21 to Sd2*n*).

The ECU 15 controls an output of the engine 11 on the basis of the request output Sd1 from the power generation system control device 1. Specifically, the ECU 15 controls a natural gas fuel injecting unit, an ignition unit, a throttle valve, and a starter. The engine 11 is, for example, a four-cylinder engine using spark ignition type combustion and is an example of an internal combustion engine. By a driving force of the engine 11, the power generator 12 generates power to realize a desired power load. The power converter 13 adjusts a voltage and a phase of the power generated by the power generator 12 and supplies the adjusted power to the load-side instrument 3.

Figure 15:
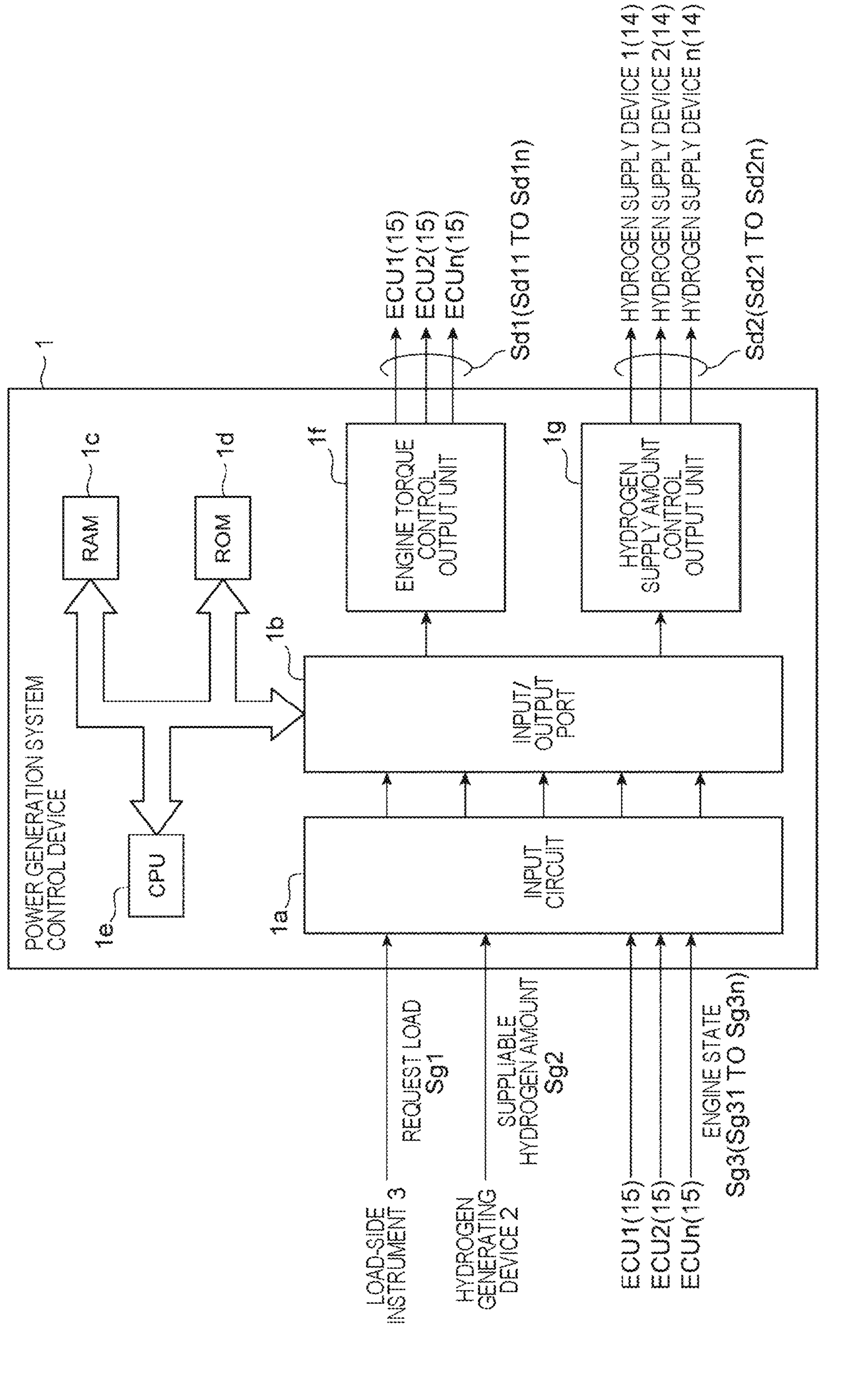
FIG. 15 is a block diagram illustrating a hardware configuration example of the power generation system control device according to the second embodiment of the present invention.

Next, an internal configuration example of the power generation system control device 1 according to the second embodiment will be described. FIG. 15 is a block diagram illustrating a hardware configuration example of the power generation system control device 1. The power generation system control device 1 is configured to use a computer device.

In FIG. 15, the request load Sg1, the suppliable hydrogen amount Sg2, and the engine states Sg3 (Sg31 to Sg3*n*) output from the load-side instrument 3, the hydrogen generating device 2, and the ECU 15, respectively, are input to an input circuit 1*a* of the power generation system control device 1. However, an input signal is not limited thereto. Each signal input to the input circuit 1*a* is sent to an input port (not illustrated) in an input/output port 1*b*. A value sent to the input port is stored in a RAM (1*c*) and subjected to arithmetic processing by a CPU (1*e*). A control program in which details of the arithmetic processing are described is written in a ROM (1*d*) in advance.

Values indicating operation amounts of control targets (the engine 11, the hydrogen supply device 14, and the like) calculated in accordance with the control program are stored in the RAM (1*c*), then sent to an output port (not illustrated) in the input/output port 1*b*, and sent as the request outputs Sd1 (Sd11 to Sd1*n*) and the desired hydrogen supply amounts (hydrogen supply target amounts) Sd2 (Sd21 to Sd2*n*) to respective devices (the ECU 15 and the hydrogen supply device 14) via respective output units (an engine torque control output unit 1*f* and a hydrogen supply amount control output unit 1*g*). In FIG. 15, the engine control devices (ECUs 15) are separately provided in the power generation system control device 1, but the present invention is not limited to this embodiment, and functional units corresponding to control devices of respective devices may be provided in the power generation system control device 1.

In a configuration including the plurality of engine power generators, the number of power generation modules GM to be operated can be adjusted depending on the total request load from the load-side instrument. For example, it is assumed that, at a certain total request output Pr1, i power generation modules are in rated operation, the catalyst is active and all the operating engines are in the warmed-up state, and operation is performed in Mode 3 (hydrogen co-combustion (lean)) in the first embodiment. In this circumstance, it is assumed that the total request output from the load-side instrument increases to Pr2 at a certain timing. At this time, in a case where it is not possible to cope with an increase in the total request output by adjusting outputs of the operating modules, k modules are newly operated to realize the total request output Pr2. Here, since the k newly started engines are cold, operation is performed in Mode 2 (hydrogen co-combustion (stoichiometric)) in the first embodiment for prompt warming-up of the engines. At this time, in order to maximize the purification performance of the catalyst, the air-fuel ratios of the i engines that have already been operated need to be stoichiometric. In the present embodiment, control is performed in such a condition in which warmed-up engines and cold engines operate in the same period of time.

Figure 16:
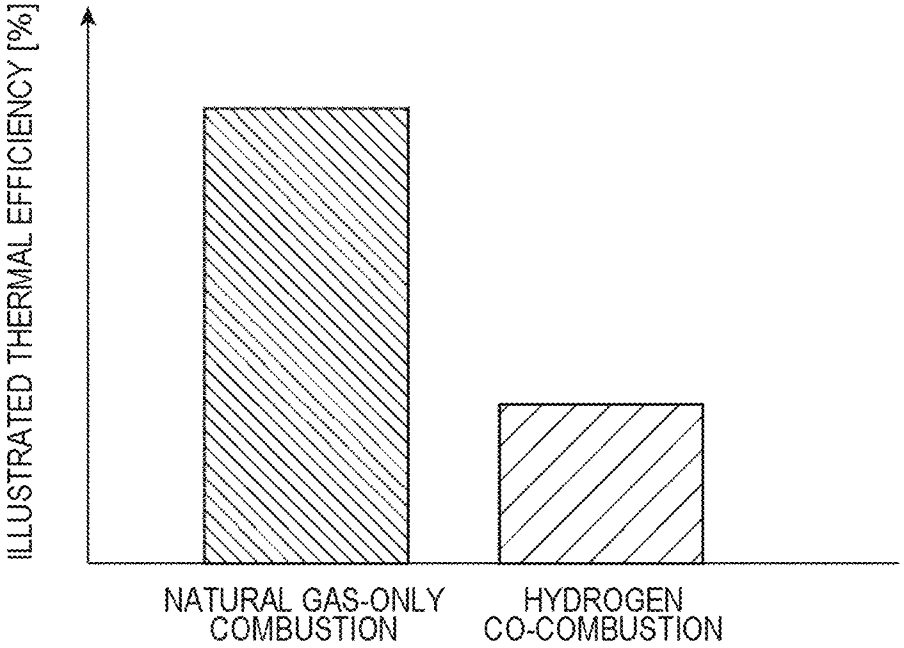
FIG. 16 is a graph illustrating graphical thermal efficiency of a natural gas-only combustion condition and a hydrogen co-combustion condition according to the second embodiment of the present invention.

FIG. 16 illustrates graphical thermal efficiency of a natural gas-only combustion condition and a hydrogen co-combustion condition. The conditions are the natural gas-only combustion conditions and the natural gas-hydrogen co-combustion conditions and are the same for each condition, with the engine rotation speed and the graphical average effective pressure being constant, the air-fuel ratio being the theoretical air-fuel ratio, and the ignition timing being the optimum ignition timing. In the hydrogen co-combustion condition, the graphical thermal efficiency is lower than that in the natural gas-only combustion condition. This is mainly because the cylinder heat transfer amount increases as illustrated in FIG. 7, and a cooling loss increases.

As described above, it is effective to perform the natural gas-only combustion from the viewpoint of the graphical thermal efficiency in the theoretical air-fuel ratio condition.

In the present embodiment, hydrocarbon-based fuel supply amounts or hydrogen supply amounts to the respective engines are controlled based on the active state of the catalyst and warmed-up states of the respective engines. Specifically, as illustrated in FIG. 17, there are provided four operation modes, in which the hydrogen mixing proportions and the air-fuel ratios are different, and control of switching the operation modes is performed depending on the active state of the catalyst and the warmed-up states of the respective engines. Since Mode 1 and Mode 2 are similar to Mode 1 and Mode 2 of the first embodiment, the description thereof is omitted. Details of Mode 3 and Mode 4 will be described below.

Mode 3

In a condition in which the catalyst is active and the engines are warmed up, and when the cold engines are not operating in the same period of time, the hydrocarbon-based fuel and hydrogen are supplied to the warmed-up engines, and the hydrogen co-combustion is performed. This enables the lean limit to increase. In addition, the air-fuel ratio of each of the engines is controlled so that the oxygen concentration of the exhaust gas flowing into the catalyst becomes equal to or higher than the predetermined value C2. The predetermined value C2 is an oxygen concentration of the exhaust gas in an air-fuel ratio (lean) condition of the engines in which the amount of NOx generated from the engines can be reduced to be equal to or smaller than a value which can sufficiently satisfy an exhaust regulation value even without using a post-processing device (in other words, in a case where the engine is operated at an air-fuel ratio at which an amount of nitrogen oxides directly emitted from the engine is equal to or smaller than a predetermined value). This enables NOX emitted from the engines to be reduced and enables purification to be performed by removing CO and HC by the catalyst with high efficiency when the cold engines are not operating in the same period of time.

Mode 4

In the condition in which the catalyst is active and the engines are warmed up, and when the cold engines are operating in the same period of time, only the hydrocarbon-based fuel is supplied to the warmed-up engines, and the hydrocarbon-based fuel-only combustion is performed. This enables the warmed-up engine to operate in a high efficiency condition. In addition, the air-fuel ratio of each of the engines is controlled so that the oxygen concentration of the exhaust gas flowing into the catalyst becomes equal to or lower than the predetermined value C1. The predetermined value C1 is an oxygen concentration of the exhaust gas in a case where the engine is operated in which the air-fuel ratio of 44 the engine is the theoretical air-fuel ratio (stoichiometric). The air-fuel ratio of each of the engines does not need to be strictly stoichiometric as long as the ratio between reactive components (HC, NOx, CO, and $H_2$) is controlled within a range of a window of the catalyst in which the ratio becomes a stoichiometrically ideal value. This enables purification to be performed by removing harmful gas component (HC, CO, and NOx) in the exhaust gas by the catalyst when the cold engines are operating in the same period of time.

Subsequently, specific processing of the present embodiment will be described.

Figure 18:
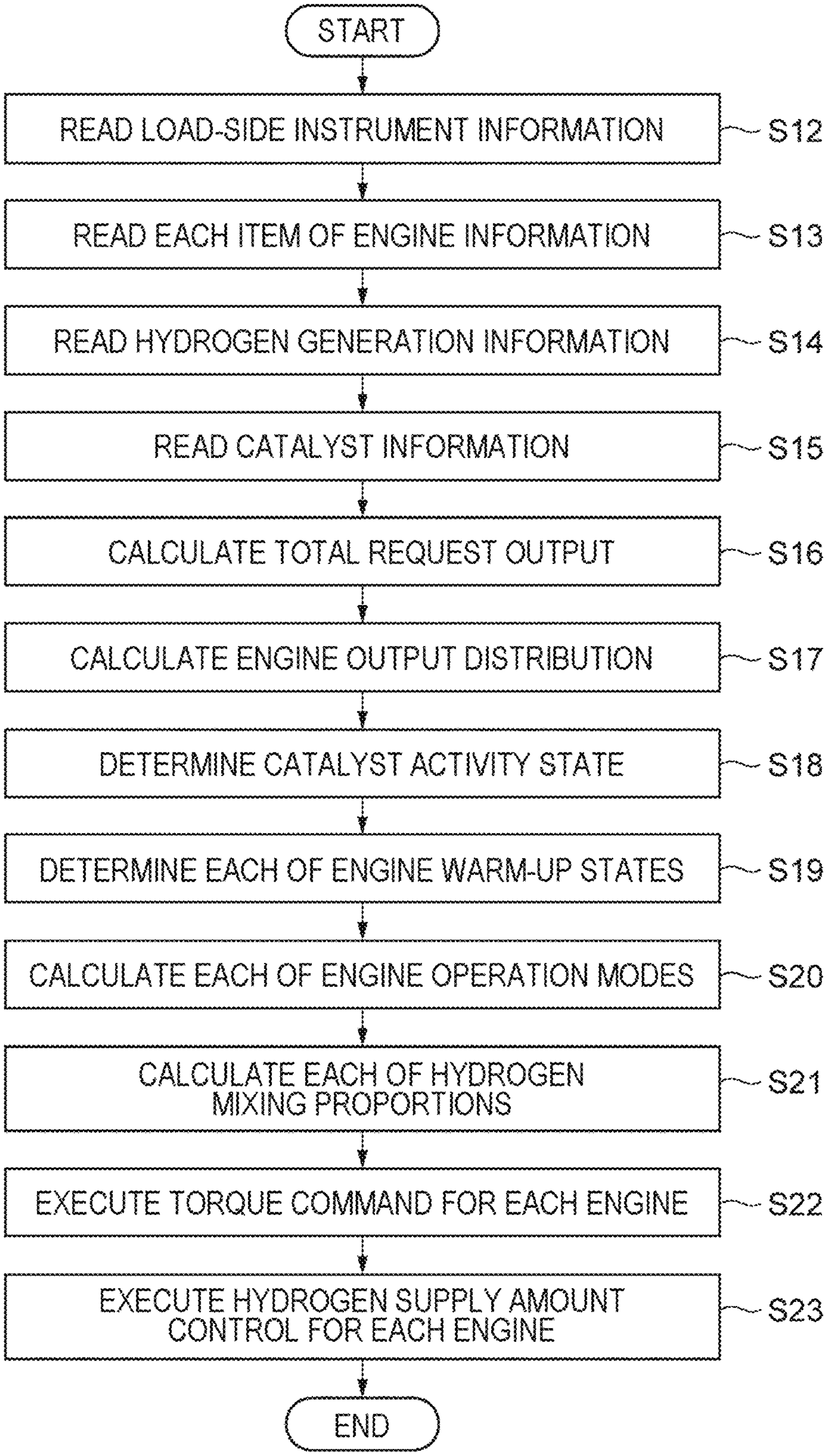
FIG. 18 is a diagram illustrating an example of a flowchart of engine power generator control according to the second embodiment of the present invention.

FIG. 18 illustrates an example of a flowchart of engine power generator control according to the present embodiment. Details of each step will be described below.

Step S12

Since processing in step S12 is similar to that in step S1 of the first embodiment, the description thereof is omitted.

Step S13

In step S13, the power generation system control device 1 reads the items of information (engine states) Sg3 (Sg31 to Sg3*n*) of the respective engines 11 from the respective ECUs 15 and the respective engines 11. The information (engine state) Sg3 from the ECU 15 or the engine 11 is, for example, an engine state such as a current engine rotation speed or torque or an engine temperature (a cooling water temperature, an inlet temperature, or the like) or engine specifications (an exhaust amount, a compression ratio, a fuel supply position, or the like).

Steps S14 to S16

Since processing in steps S14 to S16 is similar to that in steps S3 to S5 in the first embodiment, the description thereof is omitted.

Step S17

In Step S17, the power generation system control device 1 distributes the total request outputs Sd1 calculated in Step S16 to the respective engine power generation modules and obtains individual request outputs Sd11, Sd12, . . . Sd1*n* (processing step S5). For example, the number of engine power generation modules which need to be driven is calculated from the total request outputs Sd1 and rated outputs of the respective engine power generation modules, and the total request outputs Sd1 are evenly distributed to the engine power generation modules to be driven.

Step S18

Since processing in step S18 is similar to that in step S6 of the first embodiment, the description thereof is omitted.

Step S19

In step S19, the power generation system control device 1 determines the warmed-up states of the respective engines based on the items of information (engine states) Sg3 (Sg31 to Sg3*n*) from the respective ECUs 15 and the respective engines 11. Here, when an engine cooling water temperature Tw is equal to or higher than a predetermined temperature Tw1, the power generation system control device 1 determines that the engine is warmed up. When the engine cooling water temperature Tw is lower than the predetermined temperature Tw1, the power generation system control device 1 determines that the engine is cold. In this manner, since the determination is made based on a value obtained by directly detecting a cooling water temperature of the engine, the warmed-up state of the engine can be accurately determined.

Step S20

In step S20, the power generation system control device 1 calculates an operation mode of the engines based on the active state of the catalyst and the warmed-up states of the respective engine determined in steps S18 and S19. Here, of the operation modes illustrated in FIG. 17, a corresponding operation mode is set. When the catalyst is inactive (in other words, when the catalyst active state detecting unit detects that the catalyst is inactive), Mode 1 (in which only the hydrocarbon-based fuel is supplied to the engine, and the hydrocarbon-based fuel-only combustion is performed) is set. This enables the exhaust temperature to be increased and enables the catalyst to be activated promptly. When the catalyst is active and the engine is cold (in other words, when the catalyst active state detecting unit detects that the catalyst is active and the engine warmed-up state detecting unit detects that the engine is cold), Mode 2 (in which the hydrocarbon-based fuel and hydrogen are supplied to the engine, and the hydrogen co-combustion is performed) is set. This enables the cylinder heat transfer amount to be increased and enables the engine to be warmed up promptly. In the condition in which the catalyst is active and the engine is warmed up, and when the cold engines are not operating in the same period of time (in other words, when the catalyst active state detecting unit detects that the catalyst is active, the engine warmed-up state detecting unit detects that the engines are warmed up, and the cold engines will not be operated in the same period of time), Mode 3 (in which the hydrocarbon-based fuel and hydrogen are supplied to the warmed-up engines, and the hydrogen co-combustion is performed) is set. This enables the hydrogen co-combustion (lean) to be performed, enables NOx emitted from the engines to be reduced, and enables purification to be performed by removing CO and HC by the catalyst with high efficiency when the cold engines are not operating in the same period of time. In the condition in which the catalyst is active and the engine is warmed up, and when the cold engines are operating in the same period of time (in other words, when the catalyst active state detecting unit detects that the catalyst is active, the engine warmed-up state detecting unit detects that the engines are warmed up, and the cold engines are operating in the same period of time), Mode 4 is set, only the hydrocarbon-based fuel is supplied to the warmed-up engines, and the hydrocarbon-based fuel-only combustion (stoichiometric) is performed. This enables the warmed-up engine to operate in a high efficiency condition and enables purification to be performed by removing HC, CO, and NOx by the catalyst with high efficiency.

Step S21

In step S21, the power generation system control device 1 calculates hydrogen mixing proportions of the respective engines based on the operation modes calculated in step S20. Since the other processing is similar to that in step S9 of the first embodiment, the description thereof is omitted.

Step S22

In step S22, the power generation system control device 1 sends torque command values (individual request outputs Sd11, Sd12, . . . Sd1*n*) for the individual engines calculated in step S17 to the respective ECUs 15 and executes a torque command.

Step S23

In step S23, the power generation system control device 1 executes hydrogen supply amount control to realize hydrogen co-combustion proportions of the respective engines calculated in step S21. The individual hydrogen supply amount command values (Sd21, Sd22, . . . , Sd2n) are sent to the hydrogen supply device 14, and a series of control is ended.

Figure 19:
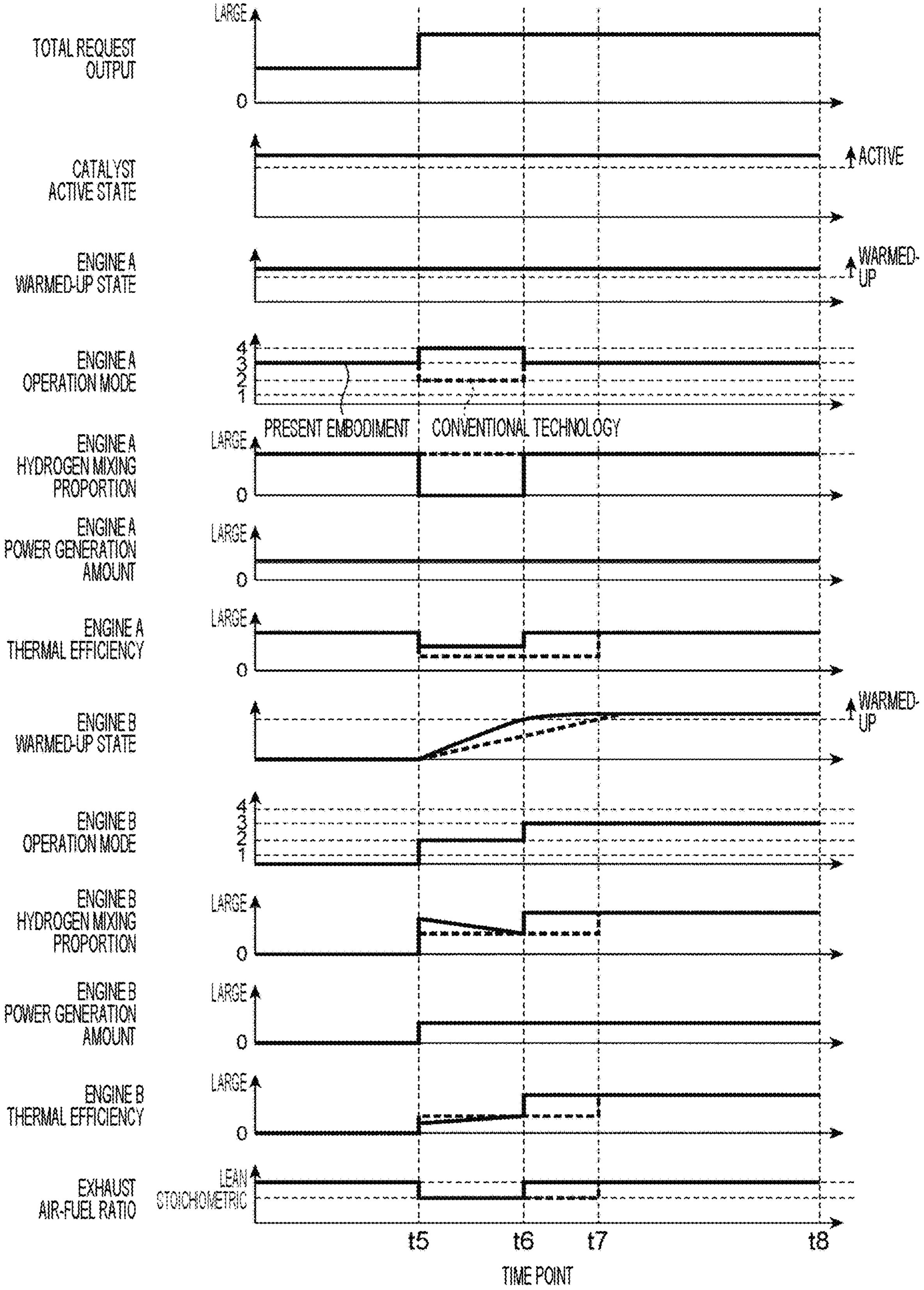
FIG. 19 is a time chart of a scene in which a total request output increases from a state in which an engine A is in rated operation and an engine B is newly started according to the second embodiment of the present invention.

FIG. 19 is a time chart of a scene in which a total request output increases from a state in which an engine A is in rated operation and an engine B is newly started according to the present embodiment. The vertical axis represents, from the top, the total request output, the catalyst active state, the warmed-up states, the operation modes, the hydrogen mixing proportions, the power generation amounts, and the thermal efficiencies of both an engine A and an engine B, and the catalyst upstream gas air-fuel ratio (exhaust air-fuel ratio), and the horizontal axis represents time. A solid line represents the present embodiment, and a broken line represents the conventional technology.

In FIG. 19, at a time point t5, the total request output increases, and the engine B is newly started to cope with the increase thereof. At this time, since a condition is set in which the catalyst is active, the engine A is warmed up, and the engine B is cold, in the present embodiment, for the engine A, the operation mode is set to Mode 4 (hydrocarbon-based fuel-only combustion), the hydrogen mixing proportion is set to 0, and the air-fuel ratio is set to be stoichiometric, and for the engine B, the operation mode is set to Mode 2 (hydrogen co-combustion), the hydrogen mixing proportion is set to the predetermined value, and the air-fuel ratio is set to be stoichiometric. On the other hand, in the conventional technology, for both the engine A and the engine B, the operation mode is set to Mode 2 (hydrogen co-combustion) set in advance, the hydrogen mixing proportion is set to the predetermined value, and the air-fuel ratio is set to be stoichiometric. In this manner, in the conventional technology, the hydrogen co-combustion is performed in the engine A, whereas in the present embodiment, the hydrocarbon-based fuel-only combustion is performed in the engine A. Hence, the thermal efficiency of the engine A can be improved as compared with the conventional technology. In addition, in the present embodiment, since the hydrogen mixing proportions are set to increase as the engines are in the cold state (although not illustrated, as the engine cooling water temperature decreases), the engine B can be warmed up more promptly in the present embodiment than in the conventional technology. At a time point t6, in the present embodiment, a condition is set in which the catalyst is active and the engine A and the engine B are warmed up, and in both the engine A and the engine B, the operation mode is set to Mode 3, the hydrogen mixing proportion is set to the predetermined value, and the air-fuel ratio is set to be lean, so that operation can be performed with high thermal efficiency. On the other hand, in the conventional technology, the catalyst is active and the engine A and the engine B are warmed up at a time point t7 after the time point t6, and a period until the operation is realized with high thermal efficiency is prolonged.

In this manner, in the present embodiment, the hydrocarbon-based fuel supply amounts or the hydrogen supply amounts (specifically, proportions of supply amounts of the hydrocarbon-based fuel and hydrogen to be supplied to the respective engines) to the respective engines are controlled based on the catalyst active state and the warmed-up states of the respective engines. This enables prompt activation of the catalyst and prompt warmed-up of the engines, and a harmful substance emission amount from the power generation system 100 can be reduced. Further, in a case where the cold engines are operating in the same period of time, the warmed-up engines can be operating in a condition of high thermal efficiency, and the fuel consumption can be reduced.

Third Embodiment

A third embodiment in the present invention will be described. In the present embodiment, a method of setting air-fuel ratios of respective engines so that a ratio between the reactive components (HC, NOx, CO, and $H_2$) of the gas flowing into the catalyst becomes a stoichiometric ideal value, in a power generation system control device according to the present invention applied to a power generation system including a plurality of engine power generators using hydrogen and natural gas as fuels, will be described. The configurations of the second embodiment are applied to configurations of the third embodiment to be described below except for configurations which differ from the configurations described in the second embodiment.

First, a method of setting air-fuel ratios of respective engines performed in the present embodiment will be described with reference to FIG. 20.

Figure 20:
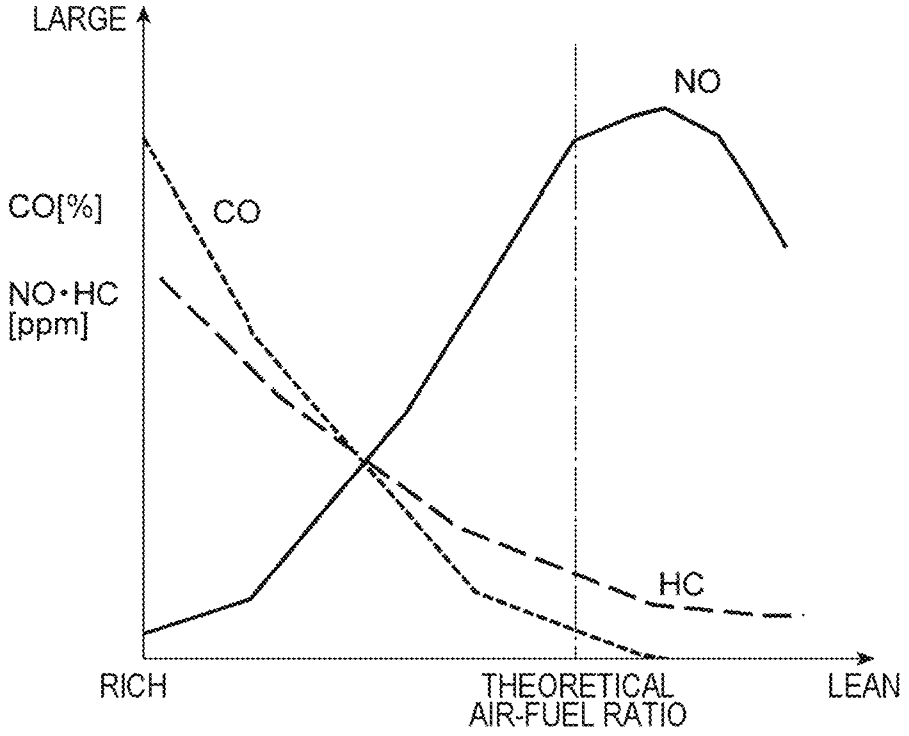
FIG. 20 is a graph illustrating a generation tendency of CO, HC, and NOx with respect to an air-fuel ratio in premixed combustion in a spark ignition type engine according to a third embodiment of the present invention.

FIG. 20 illustrates a generation tendency of CO, HC, and NOx with respect to an air-fuel ratio in premixed combustion in a spark ignition type engine. The premixing refers to a state in which air and a fuel are uniformly mixed before ignition. Here, a single fuel of a hydrocarbon-based fuel or a mixed fuel of a hydrocarbon-based fuel and hydrogen will be described as an example. Generation characteristics of each component will be described below.

CO and HC

Since CO and HC are incomplete combustion components, the air-fuel ratio is low, and an air-fuel mixture becomes rich, CO and HC increase. At the time of starting the engine or the like, a rich air-fuel mixture needs to be used in order to stabilize combustion, and thus a large amount of CO is likely to be generated.

NOx

NOx is mainly NO, and NO is generated in a large amount at a high temperature and in the presence of oxygen and nitrogen. Combustion gas is maximized in the case of a slightly richer mixing ratio than the theoretical air-fuel ratio, in which there is oxygen only during combustion, but there is no oxygen after combustion, and the amount of oxygen increases in a leaner range. Accordingly, the generation amount of NO becomes a maximum value in the leaner range than the theoretical air-fuel ratio.

The air-fuel ratios of the respective engines are set based on the generation characteristics of CO, HC, and NOx with respect to the air-fuel ratios. For example, a scene is assumed in which a total request output increases from a state in which the engine A is in rated operation and the engine B is newly started. At the time of starting the engine B, the air-fuel ratio of the engine B is set to the rich in order to stabilize combustion. At this time, a large amount of CO and HC are generated. Therefore, the air-fuel ratio of the engine A is set to be lean, and the amounts of NOx and oxygen are increased. Accordingly, the ratio between the reactive components of the gas flowing into the catalyst is set to a stoichiometric ideal value, and harmful substances can be removed through purification by the catalyst with high efficiency.

Subsequently, specific processing of the present embodiment will be described.

Figure 21:
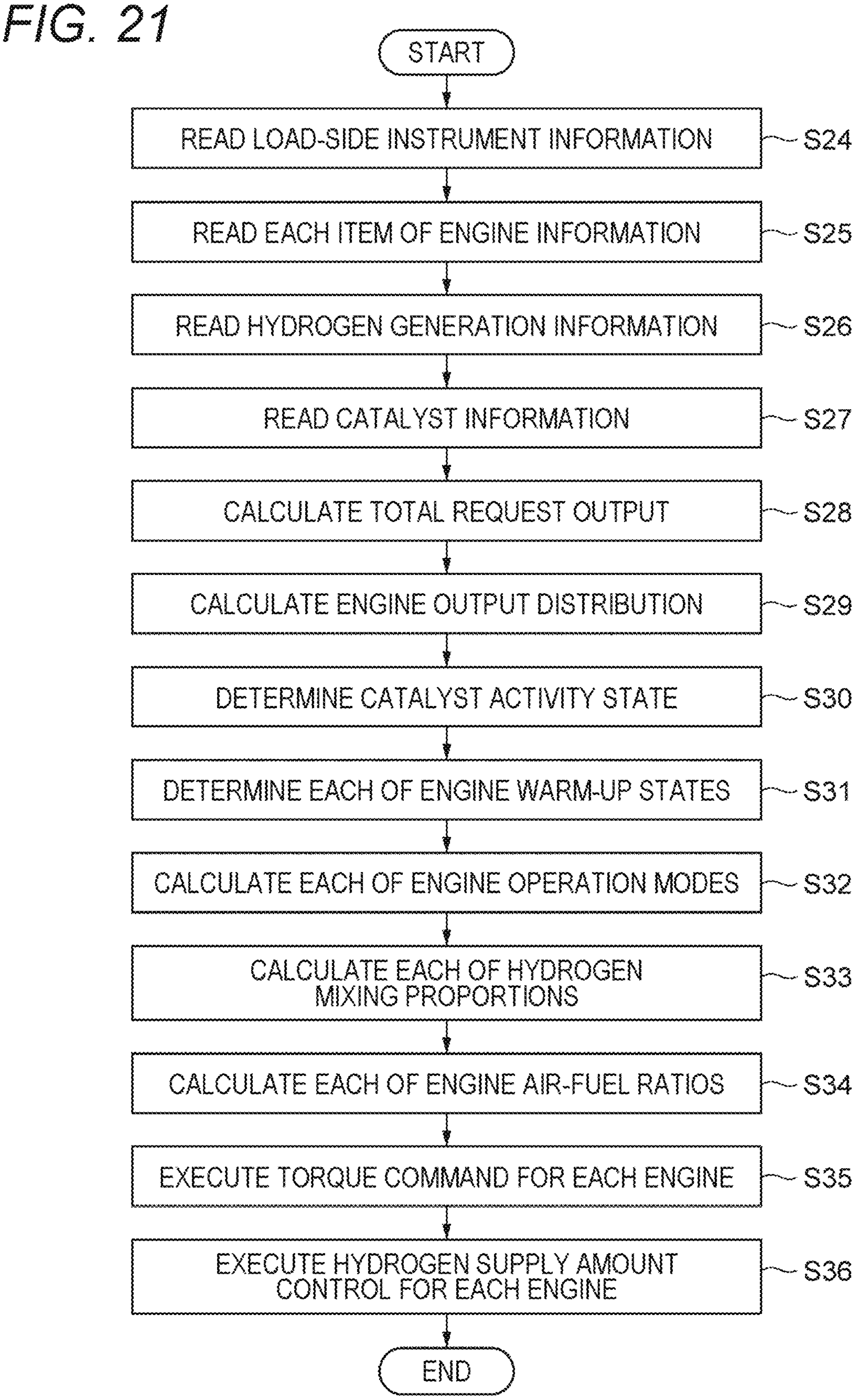
FIG. 21 is a diagram illustrating an example of a flowchart of engine power generator control according to the third embodiment of the present invention.

FIG. 21 illustrates an example of a flowchart of engine power generator control according to the present embodiment. Details of each step will be described below.

Steps S24 to S33

Since processing in steps S24 to S33 is similar to that in steps S12 to S21 in the second embodiment, the description thereof is omitted.

Step S34

In step S34, the power generation system control device 1 calculates air-fuel ratios of respective engines based on the items of information (engine states) Sg3 (Sg31 to Sg3*n*) from the respective ECUs 15 and the respective engines 11. Here, an air-fuel ratio of a newly started engine is set to be rich. In addition, the air-fuel ratios of all the already operated engines are set to be lean or stoichiometric. At this time, the air-fuel ratios of the respective engines are set so that the ratio between the reactive components of the gas flowing into the catalyst becomes the stoichiometric ideal value. For example, in the case of one newly started engine and two already operated engines, the newly started engine may be set to be rich, and all the already operated engines may be set to be lean, or one thereof may be set to be stoichiometric. By controlling the air-fuel ratios of the respective engines in this manner, the harmful substances can be removed through purification by the catalyst with high efficiency.

Steps S35 and S36

Since processing in steps S35 and S36 is similar to that in steps S22 and S23 in the second embodiment, the description thereof is omitted.

In this manner, in the present embodiment, when at least one engine is operated, the air-fuel ratio of the newly started engine is controlled to be rich, and the air-fuel ratio of the already operated engine is controlled to be lean or stoichiometric. By controlling the air-fuel ratios of the respective engines in this manner, the ratio between the reactive components of the gas flowing into the catalyst becomes a stoichiometric ideal value, and the harmful substances can be removed through purification by the catalyst with high efficiency. As a result, the harmful substance emission amount from the power generation system 100 can be reduced.

The present invention is not limited to the above-described embodiments, and it is needless to say that various other application examples and modification examples can be made without departing from the gist of the present invention described in the claims.

For example, the above-described embodiments are provided to describe the configurations of the devices and the system in detail and specifically in order to describe the present invention in an easy-to-understand manner, and the present invention is not necessarily limited to embodiments having all the described configurations. In addition, a part of a configuration of an embodiment described herein may be replaced with a configuration of another embodiment, and further a configuration of one embodiment may be added to a configuration of another embodiment. In addition, it is also possible to add, remove, and replace other configurations with respect to a part of the configurations of the respective embodiments.

In addition, control lines and information lines indicate what is considered to be necessary for the description and do not necessarily indicate all the control lines and the information lines on a product. In practice, it may be considered that almost all of the configurations are connected to each other.

REFERENCE SIGNS LIST

1 power generation system control device (engine power generation system control device)
1*a* input circuit
1*b* input/output port
1*c* RAM
1*d* ROM
1*e* CPU
1 *f* engine torque control output unit
1*g* hydrogen supply amount control output unit
2 hydrogen generating device
3 load-side instrument
11 engine
12 power generator
13 power converter
14 hydrogen supply device
15 ECU
16 exhaust passage
17 air-fuel ratio sensor
18 catalyst upstream temperature sensor
19 oxygen concentration sensor
20 exhaust purification catalyst (three-way catalyst)
21 air flow sensor
22 natural gas injecting device
23 hydrogen supply channel
24 cooling water temperature sensor
25 exhaust pipe
26 electronically controlled throttle
27 inlet pipe
28 combustion chamber
29 spark plug
30 cylinder head

The invention claimed is:

1. An engine power generation system control device for an engine power generation system that is capable of performing co-combustion when supplying a hydrocarbon-based fuel and hydrogen and performs power generation by an engine including an engine warmed-up state detecting unit which detects whether the engine is in a warmed-up state, the engine power generation system control device comprising:

a catalyst which is provided in an exhaust passage of the engine and purifies an exhaust gas; and a catalyst active state detecting unit that detects whether the catalyst is in an active state, wherein a hydrocarbon-based fuel supply amount or a hydrogen supply amount to the engine is controlled based on a catalyst active state detected by the catalyst active state detecting unit and a warmed-up state of the engine detected by the engine warmed-up state detecting unit, wherein proportions of supply amounts of a hydrocarbon-based fuel and hydrogen to the engine are controlled based on the catalyst active state detected by the catalyst active state detecting unit and the warmed-up state of the engine detected by the engine warmed-up state detecting unit.

2. The engine power generation system control device according to claim 1, wherein when the catalyst active state detecting unit detects that the catalyst is inactive, only a hydrocarbon-based fuel is supplied to the engine, and hydrocarbon-based fuel-only combustion is performed.

3. The engine power generation system control device according to claim 1, wherein when the catalyst active state detecting unit detects that the catalyst is active, a hydrocarbon-based fuel and hydrogen are supplied to the engine, and hydrogen co-combustion is performed.

4. The engine power generation system control device according to claim 3, wherein when the engine warmed-up state detecting unit detects that the engine is cold, an air-fuel ratio of the engine is controlled such that an oxygen concentration of an exhaust gas flowing into the catalyst becomes equal to or lower than a predetermined value C1, and the predetermined value C1 is an oxygen concentration of an exhaust gas in a case where the engine is operated when an air-fuel ratio of the engine is a theoretical air-fuel ratio.

5. The engine power generation system control device according to claim 3, wherein when the engine warmed-up state detecting unit detects that the engine is warmed up, an air-fuel ratio of the engine is controlled such that an oxygen concentration of an exhaust gas flowing into the catalyst becomes equal to or higher than a predetermined value C2, and the predetermined value C2 is an oxygen concentration of an exhaust gas in a case where the engine is operated at an air-fuel ratio at which an amount of nitrogen oxides directly emitted from the engine becomes equal to or smaller than a predetermined value.

6. The engine power generation system control device according to claim 1, wherein the catalyst active state detecting unit detects a catalyst-inflow gas temperature which is a temperature of gas flowing into the catalyst, and determines that the catalyst is in an active state when the catalyst-inflow gas temperature is equal to or higher than a predetermined value, and/or the engine warmed-up state detecting unit detects a cooling water temperature of the engine, and determines that the engine is in the warmed-up state when the cooling water temperature of the engine is equal to or higher than a predetermined value.

7. The engine power generation system control device according to claim 3, wherein when the engine warmed-up state detecting unit detects that the engine is cold, the hydrocarbon-based fuel supply amount or the hydrogen supply amount to the engine is controlled such that a proportion of a hydrogen amount to a total fuel supply amount decreases as a cooling water temperature of the engine increases.

8. The engine power generation system control device according to claim 1, wherein the engine power generation system includes a plurality of the engines, an exhaust passage formed by convergence of exhaust pipes of the plurality of respective engines, and the catalyst provided in the exhaust passage, and the hydrocarbon-based fuel supply amount or the hydrogen supply amount to each of the engines is controlled based on the catalyst active state detected by the catalyst active state detecting unit and the warmed-up state of each of the engines detected by the engine warmed-up state detecting unit.

9. The engine power generation system control device according to claim 8, wherein when the catalyst active state detecting unit detects that the catalyst is active and the engine warmed-up state detecting unit detects that the engine is cold, a hydrocarbon-based fuel and hydrogen are supplied to each of the engines, and hydrogen co-combustion is performed.

10. The engine power generation system control device according to claim 8, wherein when the catalyst active state detecting unit detects that the catalyst is active, the engine warmed-up state detecting unit detects that the engines are warmed up, and the cold engines will not be operated in a same period of time, the hydrocarbon-based fuel and hydrogen are supplied to the warmed-up engines, and hydrogen co-combustion is performed.

11. The engine power generation system control device according to claim 8, wherein when the catalyst active state detecting unit detects that the catalyst is active, the engine warmed-up state detecting unit detects that the engines are warmed up, and the cold engines are operating in a same period of time, only the hydrocarbon-based fuel is supplied to the warmed-up engines, and hydrocarbon-based fuel-only combustion is performed.

12. The engine power generation system control device according to claim 11, wherein when the engine warmed-up state detecting unit detects that the cold engines are operating in the same period of time, an air-fuel ratio of each of the engines is controlled such that an oxygen concentration of an exhaust gas flowing into the catalyst becomes equal to or lower than a predetermined value C1, and the predetermined value C1 is an oxygen concentration of an exhaust gas in a case where the engine is operated when an air-fuel ratio of the engine is a theoretical air-fuel ratio.

13. The engine power generation system control device according to claim 10, wherein when the engine warmed-up state detecting unit detects that the cold engines are not operating in the same period of time, an air-fuel ratio of each of the engines is controlled such that an oxygen concentration of an exhaust gas flowing into the catalyst becomes equal to or higher than a predetermined value C2, and the predetermined value C2 is an oxygen concentration of an exhaust gas in a case where the engine is operated at an air-fuel ratio at which an amount of nitrogen oxides directly emitted from the engine becomes equal to or smaller than a predetermined value.

14. The engine power generation system control device according to claim 8, wherein when at least one engine is operated, an air-fuel ratio of a newly started engine is controlled to be rich, and an air-fuel ratio of an already operated engine is controlled to be lean or stoichiometric.

* * * * *